(12) United States Patent
Lee et al.

(10) Patent No.: US 12,004,235 B2
(45) Date of Patent: Jun. 4, 2024

(54) METHOD WHEREBY TERMINAL TRANSMITS AND RECEIVES SIGNALS FOR CARRYING OUT RANDOM ACCESS CHANNEL PROCEDURE IN WIRELESS COMMUNICATION SYSTEM, AND DEVICE THEREFOR

(71) Applicant: LG ELECTRONICS INC., Seoul (KR)

(72) Inventors: Jeongsu Lee, Seoul (KR); Hyunsoo Ko, Seoul (KR); Sukhyon Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 130 days.

(21) Appl. No.: 17/607,640

(22) PCT Filed: May 4, 2020

(86) PCT No.: PCT/KR2020/005842
§ 371 (c)(1),
(2) Date: Oct. 29, 2021

(87) PCT Pub. No.: WO2020/226377
PCT Pub. Date: Nov. 12, 2020

(65) Prior Publication Data
US 2022/0248475 A1    Aug. 4, 2022

(30) Foreign Application Priority Data
May 3, 2019   (KR) .................. 10-2019-0052629

(51) Int. Cl.
*H04W 74/0833*    (2024.01)
*H04L 27/26*    (2006.01)
(Continued)

(52) U.S. Cl.
CPC ..... *H04W 74/0841* (2013.01); *H04L 27/2636* (2013.01); *H04W 72/1268* (2013.01); *H04W 74/004* (2013.01); *H04W 74/0866* (2013.01)

(58) Field of Classification Search
CPC .......... H04W 74/0841; H04W 74/004; H04W 74/0866; H04W 74/0833; H04W 72/1268;
(Continued)

(56) References Cited

U.S. PATENT DOCUMENTS 11,272,532 B2 *  3/2022  Jeon ................. H04W 72/0446
2014/0056379 A1  2/2014  Jongren et al.
(Continued)

FOREIGN PATENT DOCUMENTS

CN      106465401 A    2/2017
EP       3884726 A1    9/2021
(Continued)

OTHER PUBLICATIONS

Search Report of European Patent Office in Appl'n No. 20801731.9, dated May 11, 2022.
(Continued)

*Primary Examiner* — Kwang B Yao
*Assistant Examiner* — Syed M Bokhari
(74) *Attorney, Agent, or Firm* — BRYAN CAVE LEIGHTON PAISNER LLP

(57) ABSTRACT

The present disclosure provides a method whereby a terminal transmits and receives signals for carrying out a random access channel (RACH) procedure in a wireless communication system. In particular, the method comprises: receiving first information about a transform precoder related to a physical uplink shared channel (PUSCH) transmitted via message A; on the basis of the first information, transmitting message A including the PUSCH and a physical random access channel (PRACH); and in response to message A,
(Continued)

receiving message B including contention resolution information, wherein the first information may be used to indicate transform precoding for the PUSCH on the basis that the PUSCH is transmitted via message A.

9 Claims, 30 Drawing Sheets

(51) Int. Cl.
*H04W 72/1268* (2023.01)
*H04W 74/00* (2009.01)
*H04W 74/08* (2009.01)

(58) Field of Classification Search
CPC .............. H04W 74/002; H04W 74/006; H04L 27/2636; H04L 1/1854; H04L 1/0018; H04L 27/2601; H04L 27/2602; H04B 7/0404; H04B 7/0456
USPC .......................................................... 370/329
See application file for complete search history.

(56) References Cited

U.S. PATENT DOCUMENTS

| | | | |
|---|---|---|---|
| 2017/0311319 A1* | 10/2017 | Lee ........................ | H04L 1/1822 |
| 2018/0027594 A1 | 1/2018 | Nagaraja et al. | |
| 2018/0279376 A1 | 9/2018 | Dinan et al. | |
| 2020/0221506 A1* | 7/2020 | Jeon ................... | H04W 74/0808 |
| 2020/0267772 A1* | 8/2020 | Jung ................... | H04W 74/004 |
| 2020/0296736 A1* | 9/2020 | Yokomakura ......... | H04L 5/0053 |
| 2021/0281374 A1* | 9/2021 | Kim ..................... | H04J 13/0048 |
| 2022/0159739 A1* | 5/2022 | Takeda .............. | H04W 74/0841 |

FOREIGN PATENT DOCUMENTS

| | | |
|---|---|---|
| JP | 2013512614 A | 4/2013 |
| KR | 1020140146593 A | 12/2014 |
| WO | 2018049274 A1 | 3/2018 |
| WO | 2018062717 A1 | 4/2018 |
| WO | 2018232321 A2 | 12/2018 |
| WO | 2020139056 A1 | 7/2020 |

OTHER PUBLICATIONS

Panasonic, "Discussion on 2-step RACH procedure", 3GPP TSG RAN WG1 #96bis, Apr. 8-12, 2019, R1-1904358, XP051699649.
Ericsson, "Channel Structure for Two-Step RACH", 3GPP TSG-RAN WG1 Meeting #96bis, Apr. 8-12, 2019, R1-1904842, XP051699989.
LG Electronics, "Discussion on Procedure for 2-step rach", 3gpp tsg ran WG1 Meeting #97, May 13-17, 2019, R1-1906718, XP051708754.
"3rd Generation Partnership Project; Technical Specification Group Radio Access Network; NR; Physical layer procedures for date (Release 15)", 3GPP TS 38.214 V15.5.0 (Mar. 27, 2019).
Vivo, "Discussion on channel structure for 2-step Rach", 3GPP Tsg Ran WG1 #96, Feb. 25 - Mar. 1, 2019, R1-1901669.
ZTE, "Updated summary of 7.2.1.1 Channel Structure for Two-step RACH", 3GPP TSG RAN WG1 #96bis, Apr. 8-12, 2019, R1-1905793.
Panasonic, "Discussion on channel structure for 2-step RACH", 3GPP TSG RAN WG1 #96bis, Apr. 8-12, 2019, R1-1904357.
Nokia, Nokia Shanghai Bell, "On 2-step RACH Channel Structure", 3GPP TSG RAN WG1 #96bis, Apr. 8-12, 2019, R1-1904715.

* cited by examiner (A) CONTROL-PLANE PROTOCOL STACK (B) USER-PLANE PROTOCOL STACK

METHOD WHEREBY TERMINAL TRANSMITS AND RECEIVES SIGNALS FOR CARRYING OUT RANDOM ACCESS CHANNEL PROCEDURE IN WIRELESS COMMUNICATION SYSTEM, AND DEVICE THEREFOR

This application is the National Stage filing under 35 U.S.C. 371 of International Application No. PCT/KR2020/005842 filed on May 4, 2020, which claims priority to Korean Patent Application Nos. 10-2019-0052629 filed on May 3, 2019, the contents of which are all hereby incorporated by reference herein in their entirety.

TECHNICAL FIELD

The present disclosure relates to a method for transmitting and receiving signals for performing a random access channel (RACH) procedure by a user equipment (UE) in a wireless communication system, and a device for the same, and more particularly to a method for transmitting and receiving signals for performing a 2-step random access channel (RACH) procedure by a user equipment (UE) in a wireless communication system, and a device for the same.

BACKGROUND ART

The necessity for mobile broadband communication more improved than the conventional radio access technology (RAT) has increased as a number of communication devices has required higher communication capacity. In addition, massive machine type communications (MTC) capable of providing various services anytime and anywhere by connecting a number of devices or things to each other has been considered as a main issue in the next generation communications. Moreover, a communication system design capable of supporting services sensitive to reliability and latency has been discussed. The introduction of next-generation RAT considering enhanced mobile broadband communication (eMBB), massive MTC (mMTC), ultra-reliable and low-latency communication (URLLC), etc. has been discussed. In the present disclosure, the corresponding technology is referred to as new radio access technology (NR), for convenience of description.

DISCLOSURE

Technical Problem

The present disclosure provides a method for performing a random access channel (RACH) procedure by a user equipment (UE) and a device for the same.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

In accordance with an aspect of the present disclosure, a method for transmitting and receiving signals for performing a random access channel (RACH) procedure by a user equipment (UE) in a wireless communication system may include receiving, from a base station (BS), first information about a transform precoder related to a physical random access channel (PRACH) transmitted through a message A; transmitting, to the base station (BS), the message A including a physical random access channel (PRACH) and a physical uplink shared channel (PUSCH) on the basis of the first information; and as a response to the message A, receiving a message B including contention resolution information from the base station (BS), wherein, based on that the PUSCH is transmitted through the message A, the first information is used to indicate a transform precoding for the PUSCH.

The user equipment (UE) may receive, from the base station, second information about a transform precoder related to a physical uplink shared channel (PUSCH) transmitted through a message 3 for the random access channel (RACH) procedure.

Based on that the first information is not received, the second information may be used to indicate the transform precoding.

The first information and the second information may be based on an uplink common configuration.

The first information and the second information may be received by higher layer signaling.

The transform precoding may be a Discrete Fourier Transform-spread-Orthogonal Frequency Division Multiplexing (DFT-s-OFDM) scheme or a Cyclic Prefix-OFDM (CP-OFDM).

In accordance with another aspect of the present disclosure, a device configured to transmit and receive signals for performing a random access channel (RACH) procedure in a wireless communication system may include at least one processor; and at least one memory operatively connected to the at least one processor, and configured to store instructions such that the at least one processor performs specific operations by executing the instructions, wherein the specific operations include receiving first information about a transform precoder related to a physical random access channel (PRACH) transmitted through a message A; transmitting the message A including a physical random access channel (PRACH) and a physical uplink shared channel (PUSCH) on the basis of the first information; and as a response to the message A, receiving a message B including contention resolution information, wherein, based on that the PUSCH is transmitted through the message A, the first information is used to indicate a transform precoding for the PUSCH.

The device may receive second information about a transform precoder related to a physical uplink shared channel (PUSCH) transmitted through a message 3 for the random access channel (RACH) procedure.

Based on that the first information is not received, the second information may be used to indicate the transform precoding.

The first information and the second information may be based on an uplink common configuration.

The first information and the second information may be received by higher layer signaling.

The transform precoding may be a Discrete Fourier Transform-spread-Orthogonal Frequency Division Multiplexing (DFT-s-OFDM) scheme or a Cyclic Prefix-OFDM (CP-OFDM).

Advantageous Effects

As is apparent from the above description, the user equipment (UE) for use in a wireless communication system can smoothly transmit and receive signals for performing the 2-step random access channel (RACH) procedure.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BEST MODE

Figure 1:
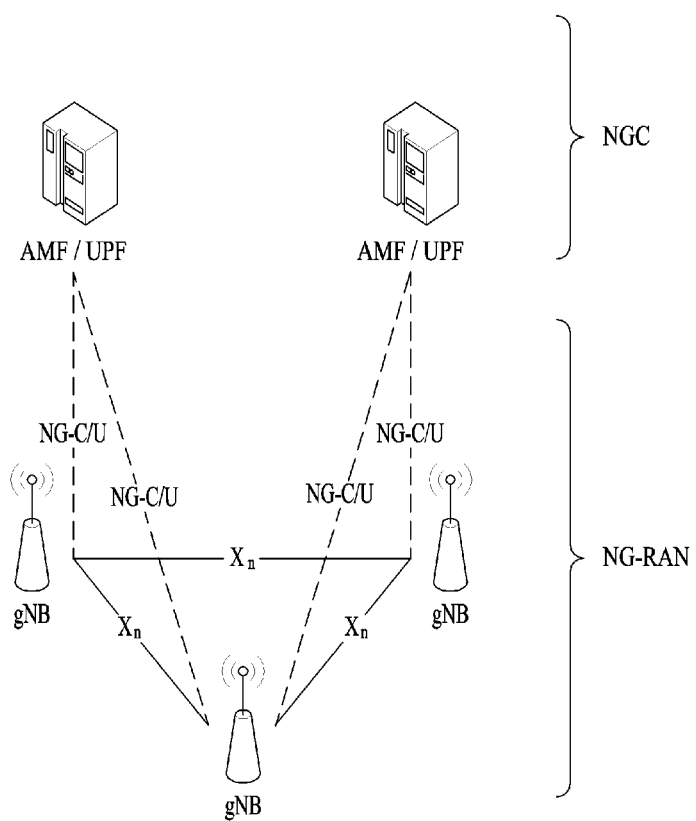
FIG. 1 is a view illustrating an example of a network architecture of a new radio (NR) system.

The configuration, operation, and other features of the present disclosure will be easily understood from embodiments of the present disclosure, examples of which are illustrated in the accompanying drawings. The following embodiments are examples in which the technical features of the present disclosure are applied to a $3^{rd}$ generation partnership project (3GPP) system.

While embodiments of the present disclosure are described in the context of long term evolution (LTE), long term evolution-advanced (LTE-A), and new radio access technology (NewRAT or NR) systems, they are merely examples. The embodiments of the present disclosure are applicable to any communication system corresponding to the above definition.

Further, the term used herein "base station (BS)" encompasses "remote radio head (RRH)", "evolved node B (eNode B or eNB)", "transmission point (TP)", "reception point (RP)", "relay", and so on.

The 3GPP communication standards define downlink (DL) physical channels corresponding to resource elements (REs) carrying information originated from a higher layer and DL physical signals corresponding to REs which are used in the physical (PHY) layer but do not carry information originated from a higher layer. For example, the DL physical channels include physical downlink shared channel (PDSCH), physical broadcast channel (PBCH), physical multicast channel (PMCH), physical control format indicator channel (PCFICH), physical downlink control channel (PDCCH), and physical hybrid automatic repeat request indicator channel (PHICH). The DL physical signals include, for example, reference signal (RS) and synchronization signal (SS). The RS is also called pilot, which is a signal of a predefined special waveform known to both a next-generation node B (gNB) and a user equipment (UE). For example, RSs include cell-specific RS, UE-specific RS (UE-RS), positioning RS (PRS), and channel state information (CSI) RS (CSI-RS). The 3 GPP LTE/LTE-A standards define uplink (UL) physical channels corresponding to REs carrying information originated from a higher layer, and UL physical signals corresponding to REs which are used in the PHY layer but do not carry information originated from a higher layer. For example, the UL physical channels include physical uplink shared channel (PUSCH), physical uplink control channel (PUCCH), and physical random access channel (PRACH). The UL physical signals include demodulation reference signal (DMRS) for UL control and data signals, and sounding reference signal (SRS) used for UL channel measurement.

In the present disclosure, the PDCCH, PCFICH, PHICH, and PDSCH refer to sets of time-frequency resources or REs that carry downlink control information (DCI), a control format indicator (CFI), a DL acknowledgment/negative acknowledgment (ACK/NACK), and DL data, respectively. Further, the PUCCH, PUSCH, and PRACH refer to sets of time-frequency resources or REs that carry uplink control information (UCI), UL data, and a random access signal, respectively. In the present disclosure, particularly time-frequency resources or REs allocated to or belonging to the PDCCH, PCFICH, PHICH, PDSCH, PUCCH, PUSCH, and PRACH are referred to as PDCCH, PCFICH, PHICH, PDSCH, PUCCH, PUSCH, and PRACH resources or REs, respectively. When it is said that a UE transmits the PUCCH, PUSCH, or PRACH, this implies that the UE transmits UCI, UL data, or a random access signal on or through the PUSCH, PUCCH, or PRACH. Further, when it is said that the gNB transmits the PDCCH, PCFICH, PHICH, or PDSCH, this implies that the gNB transmits DL data or DCI on or through the PDCCH, PCFICH, PHICH, or PDSCH.

OFDM symbols, carriers, subcarriers, and REs allocated to or configured with the CRS, DMRS, CSI-RS, SRS, and UE-RS are referred to CRS, DMRS, CSI-RS, SRS, and UE-RS symbols, carriers, subcarriers, and REs, respectively. For example, an OFDM symbol allocated to or configured with a tracking reference signal (TRS) is referred to as a TRS symbol, a subcarrier allocated to or configured with the TRS is referred to as a TRS subcarrier, and an RE allocated to or configured with the TRS is referred to as a TRS RE. Further, a subframe configured for TRS transmission is referred to as a TRS subframe. A subframe carrying a broadcast signal is referred to as a broadcast subframe or a PBCH subframe, and a subframe carrying an SS (e.g., a primary synchronization signal (PSS) and/or a secondary synchronization signal (SSS)) is referred to as an SS subframe or a PSS/SSS subframe. An OFDM symbol, subcarrier, and RE allocated to or configured with the PSS/SSS are referred to as a PSS/SSS symbol, subcarrier, and RE, respectively.

In the present disclosure, a CRS port, a UE-RS port, a CSI-RS port, and a TRS port is an antenna port configured for CRS transmission, an antenna port configured for UE-RS transmission, an antenna port configured for CSI-RS transmission, and an antenna port configured for TRS transmission, respectively. Antenna ports configured for transmission of CRSs may be distinguished from each other by the positions of REs occupied by the CRSs according to CRS ports. Antenna ports configured for transmission of UE-RSs may be distinguished from each other by the positions of REs occupied by the UE-RSs according to UE-RS ports. Antenna ports configured for transmission of CSI-RSs may be distinguished from each other by the positions of REs occupied by the CSI-RSs according to CSI-RS ports. Accordingly, the terms CRS port, UE-RS port, CSI-RS port, and TRS port are used in the meaning of patterns of REs occupied by the CRS, UE-RS, the CSI-RS, and the TRS, respectively.

FIG. 1 is a view illustrating an example of a network architecture of an NR system.

The network of the NR system is largely composed of a next-generation radio access network (NG-RAN) and a next-generation core (NGC) network. NGC is also referred to as 5GC.

Referring to FIG. 1, the NG-RAN includes gNBs that provide a UE with user plane protocol (e.g., SDAP, PDCP, RLC, MAC, and PHY) and control plane protocol (e.g., RRC, PDCP, RLC, MAC, and PHY) terminations. The gNBs are interconnected through an Xn interface. The gNBs are connected to the NGC through an NG interface. For example, the gNBs are connected to a core network node having an access and mobility management function (AMF) through an N2 interface, which is one of interfaces between the gNBs and the NGC and to a core network node having a user plane function (UPF) through an N3 interface, which is another interface between the gNB and the NGC. The AMF and the UPF may be implemented by different core network devices or may be implemented by one core network device. In the RAN, signal transmission/reception between a BS and a UE is performed through a radio interface. For example, signal transmission/reception between the BS and the UE in the RAN is performed through a physical resource (e.g., a radio frequency (RF)). In contrast, signal transmission/reception between the gNB and the network functions (e.g., AMF and UPF) in the core network may be performed through physical connection (e.g., optical cable) between the core network nodes or through logical connection between the core network functions, rather than through the radio interface.

Figure 2:
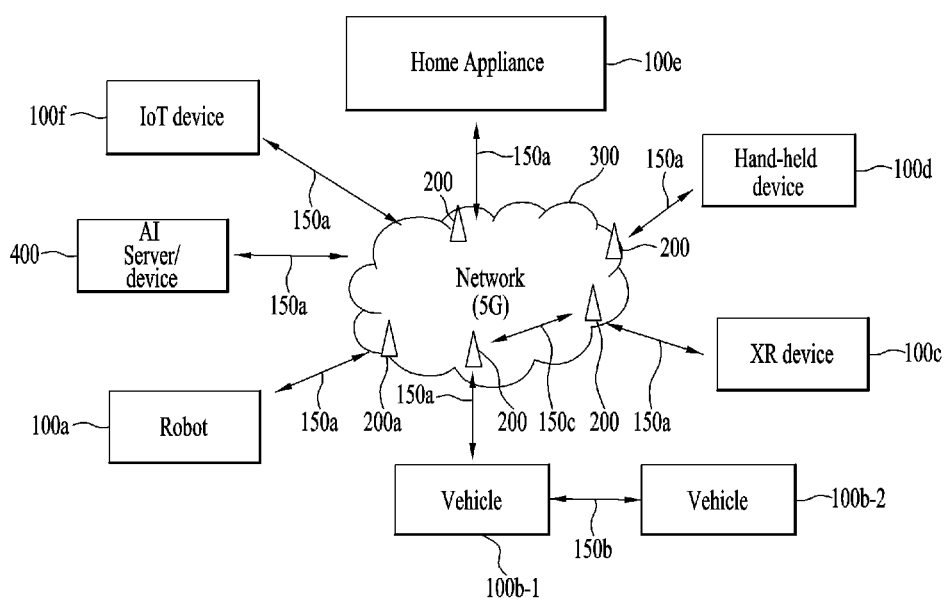
FIG. 2 is a diagram illustrating an exemplary wireless communication environment to which embodiments of the present disclosure are applicable.

FIG. 2 illustrates a communication system 1 applied to the present disclosure.

Referring to FIG. 2, the communication system 1 applied to the present disclosure includes wireless devices, BSs, and a network. The wireless devices are devices performing communication using RAT (e.g., 5G NR or LTE) and may be referred to as communication/radio/5G devices. The wireless devices may include, but not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an augmented reality (AR)/virtual reality (VR)/mixed reality (MR) device, and may be implemented in the form of a head-mounted device (HMD), a head-up display (HUD) mounted in a vehicle, a television, a smartphone, a computer, a wearable, a home appliance, a digital signage, a vehicle, a robot, and so on. The hand-held device may include a smartphone, a smart pad, a wearable device (e.g., a smart watch or a smart glasses), and a computer (e.g., a laptop). The home appliance may include a television, a refrigerator, and a washing machine. The IoT device may include a sensor and a smart meter. For example, the BSs and the network may be implemented as wireless devices, and a specific wireless device 200a may operate as a BS/network node for other wireless devices.

The wireless devices 100a to 100f may be connected to the network 300 via the BSs 200. AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200 or the network 300, the wireless devices 100a to 100f may perform direct communication (e.g., sidelink communication) with each other without intervention of the BSs or the network. For example, the vehicles 100b-1 and 100b-2 may perform direct communication (e.g. V2V/V2X communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f and the BSs 200, or between BSs 200. The wireless communication/connections may be established through various RATs (e.g., 5G NR) such as UL/DL communication 150a, sidelink communication 150b (or, D2D communication), or inter-BS communication 150c (e.g. relay and integrated access backhaul (IAB)). Radio signals may be transmitted and received between the wireless devices, between the wireless devices and the BSs, and between the BSs through the wireless communication/connections 150a, 150b, and 150c. For example, signals may be transmitted and received on various physical signals through the wireless communication/connections 150a, 150b, and 150c. To this end, at least a part of various configuration information configuring processes, various signal processing processes (e.g., channel encoding/decoding, modulation/demodulation, and resource mapping/demapping), and resource allocating processes, for transmitting/receiving radio signals may be performed based on the various proposals of the present disclosure.

5G communication involving a new radio access technology (NR) system will be described below.

Three key requirement areas of 5G are (1) enhanced mobile broadband (eMBB), (2) massive machine type communication (mMTC), and (3) ultra-reliable and low latency communications (URLLC).

Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is AR for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases in a 5G communication system including the NR system will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

Figure 3:
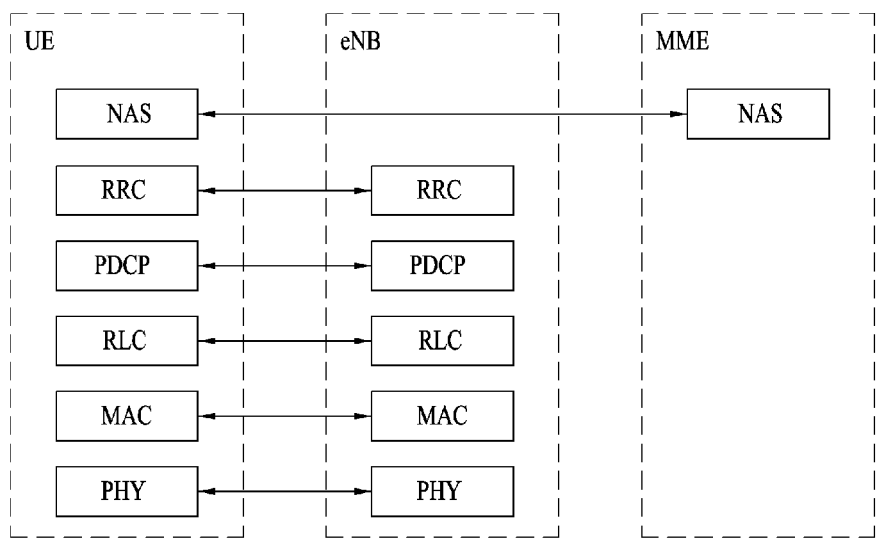
FIG. 3 is a diagram illustrating a control-plane protocol stack and a user-plane protocol stack in a radio interface protocol architecture conforming to a 3rd generation partnership project (3GPP) radio access network standard between a user equipment (UE) and an evolved UMTS terrestrial radio access network (E-UTRAN)
Figure 3:
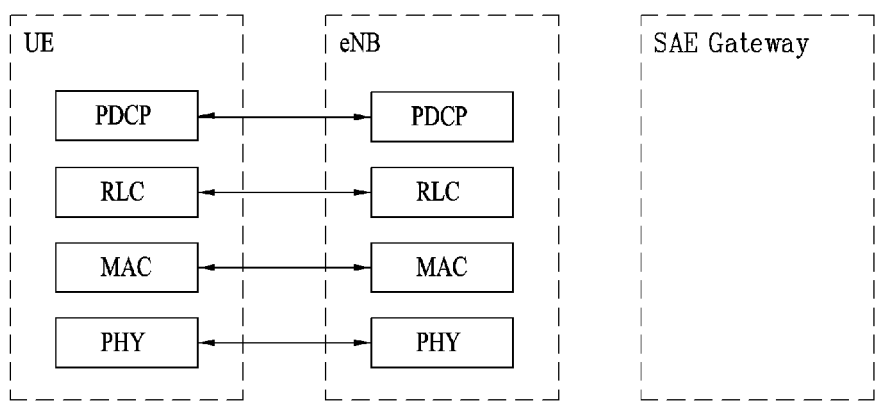

FIG. 3 illustrates control-plane and user-plane protocol stacks in a radio interface protocol architecture conforming to a 3GPP wireless access network standard between a UE and an evolved UMTS terrestrial radio access network (E-UTRAN). The control plane is a path in which the UE and the E-UTRAN transmit control messages to manage calls, and the user plane is a path in which data generated from an application layer, for example, voice data or Internet packet data is transmitted.

A physical (PHY) layer at layer 1 (L1) provides information transfer service to its higher layer, a medium access control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in orthogonal frequency division multiple access (OFDMA) for downlink (DL) and in single carrier frequency division multiple access (SC-FDMA) for uplink (UL).

The MAC layer at layer 2 (L2) provides service to its higher layer, a radio link control (RLC) layer via logical channels. The RLC layer at L2 supports reliable data transmission. RLC functionality may be implemented in a function block of the MAC layer. A packet data convergence protocol (PDCP) layer at L2 performs header compression to reduce the amount of unnecessary control information and thus efficiently transmit Internet protocol (IP) packets such as IP version 4 (IPv4) or IP version 6 (IPv6) packets via an air interface having a narrow bandwidth.

A radio resource control (RRC) layer at the lowest part of layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a broadcast channel (BCH) carrying system information, a paging channel (PCH) carrying a paging message, and a shared channel (SCH) carrying user traffic or a control message. DL multicast traffic or control messages or DL broadcast traffic or control messages may be transmitted on a DL SCH or a separately defined DL multicast channel (MCH). UL transport channels used to deliver data from a UE to the E-UTRAN include a random access channel (RACH) carrying an initial control message and a UL SCH carrying user traffic or a control message. Logical channels that are defined above transport channels and mapped to the transport channels include a broadcast control channel (BCCH), a paging control channel (PCCH), a Common Control Channel (CCCH), a multicast control channel (MCCH), a multicast traffic channel (MTCH), etc.

Figure 4:
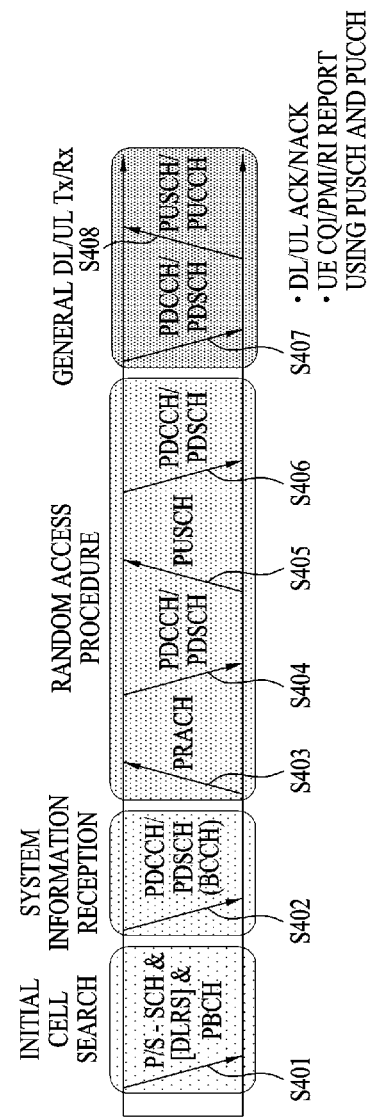
FIG. 4 is a diagram illustrating physical channels and a general signal transmission method using the physical channels in a 3GPP system.

FIG. 4 illustrates physical channels and a general method for transmitting signals on the physical channels in the 3GPP system.

Referring to FIG. 4, when a UE is powered on or enters a new cell, the UE performs initial cell search (S401). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a downlink reference signal (DL RS).

After the initial cell search, the UE may acquire detailed system information by receiving a physical downlink control channel (PDCCH) and receiving a physical downlink shared channel (PDSCH) based on information included in the PDCCH (S402).

If the UE initially accesses the eNB or has no radio resources for signal transmission to the eNB, the UE may perform a random access procedure with the eNB (S403 to S406). In the random access procedure, the UE may transmit a predetermined sequence as a preamble on a physical random access channel (PRACH) (S403 and S405) and may receive a response message to the preamble on a PDCCH and a PDSCH associated with the PDCCH (S404 and S406). In the case of a contention-based RACH, the UE may additionally perform a contention resolution procedure.

After the above procedure, the UE may receive a PDCCH and/or a PDSCH from the eNB (S407) and transmit a physical uplink shared channel (PUSCH) and/or a physical uplink control channel (PUCCH) to the eNB (S408), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

The use of an ultra-high frequency band, that is, a millimeter frequency band at or above 6 GHz is under consideration in the NR system to transmit data in a wide frequency band, while maintaining a high transmission rate for multiple users. The 3 P calls this system NR. In the present disclosure, the system will also be referred to as an NR system.

In NR, various numerologies or subcarrier spacings (SCSs) may be supported to support various 5G services. For example, with an SCS of 15 kHz, a wide area in traditional cellular bands may be supported, while with an SCS of 30 kHz or 60 kHz, a dense urban area, a lower latency, and a wide carrier bandwidth may be supported.

With an SCS of 60 kHz or higher, a bandwidth larger than 24.25 kHz may be supported to overcome phase noise.

An NR frequency band may be defined by two types of frequency ranges, FR1 and FR2. FR1 may be a sub 6 GHz range, and FR2 may be an above 6 GHz range called millimeter wave (mmW).

Table 1 below defines the NR frequency bands.

TABLE 1

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

Discontinuous Reception (DRX) Operation

The UE may perform DRX operation while executing the above-described/proposed procedures and/or methods. When the UE is configured with DRX, the UE may reduce power consumption by receiving DL signals discontinuously. DRX may be performed in RRC_IDLE, RRC_INACTIVE, and RRC_CONNECTED states. In the RRC_IDLE and RRC_INACTIVE states, DRX may be used to receive paging signals discontinuously. Hereinafter, DRX performed in the RRC_CONNECTED state will be described (RRC_CONNECTED DRX).

Figure 5:
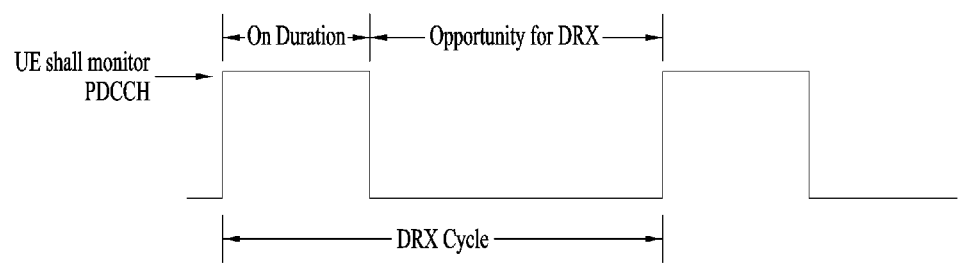
FIG. 5 is a diagram illustrating an embodiment of a discontinuous reception (DRX) operation.

FIG. 5 is a diagram illustrating a DRX cycle (RRC_CONNECTED state).

Referring to FIG. 5, the DRX cycle includes On Duration and Opportunity for DRX. The DRX cycle defines a time interval in which On Duration is periodically repeated. On Duration is a time period during which the UE monitors to receive a PDCCH. When DRX is configured, the UE performs PDCCH monitoring during the On Duration. When there is any successfully detected PDCCH during the PDCCH monitoring, the UE operates an inactivity timer and is maintained in an awake state. On the other hand, when there is no successfully detected PDCCH during the PDCCH monitoring, the UE enters a sleep state, when the On Duration ends. Therefore, if DRX is configured, PDCCH monitoring/reception may be performed discontinuously in the time domain, when the afore-described/proposed procedures and/or methods are performed. For example, if DRX is configured, PDCCH reception occasions (e.g., slots having PDCCH search spaces) may be configured discontinuously according to a DRX configuration in the present disclosure. On the contrary, if DRX is not configured, PDCCH monitoring/reception may be performed continuously in the time domain, when the afore-described/proposed procedures and/or methods are performed. For example, if DRX is not configured, PDCCH reception occasions (e.g., slots having PDCCH search spaces) may be configured continuously in the present disclosure. PDCCH monitoring may be limited in a time period configured as a measurement gap, irrespective of whether DRX is configured.

Table 2 describes a UE operation related to DRX (in the RRC_CONNECTED state). Referring to Table 1, DRX configuration information is received by higher-layer (RRC) signaling, and DRX ON/OFF is controlled by a DRX command of the MAC layer. Once DRX is configured, the UE may perform PDCCH monitoring discontinuously in performing the described/proposed procedures and/or methods according to the present disclosure, as illustrated in FIG. 5.

TABLE 2

| Type of signals | UE procedure |
| --- | --- |
| $1^{st}$ step RRC signalling (MAC-CellGroupConfig) | Receive DRX configuration information |
| $2^{nd}$ Step MAC CE ((Long) DRX command MAC CE) | Receive DRX command |
| $3^{rd}$ Step — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.—Value of drx-OnDurationTimer: defines the length of the starting duration of a DRX cycle.

Value of drx-InactivityTimer: defines the length of a time duration in which the UE is in the awake state after a PDCCH occasion in which a PDCCH indicating initial UL or DL data has been detected.

Value of drx-HARQ-RTT-TimerDL: defines the length of a maximum time duration from reception of a DL initial transmission to reception of a DL retransmission.

Value of drx-HARQ-RTT-TimerDL: defines the length of a maximum time duration from reception of a grant for a DL initial transmission to reception of a grant for a UL retransmission.

drx-LongCycleStartOffset: defines the time duration and starting time of a DRX cycle.

drx-ShortCycle (optional): defines the time duration of a short DRX cycle.

When at least one of drx-OnDurationTimer, drx-InactivityTimer, drx-HARQ-RTT-TimerDL, or drx-HARQ-RTT-TimerDL is running, the UE performs PDCCH monitoring in each PDCCH occasion, while staying in the awake state.

Multiplexing of Short PUCCH and Long PUCCH

Figure 6:
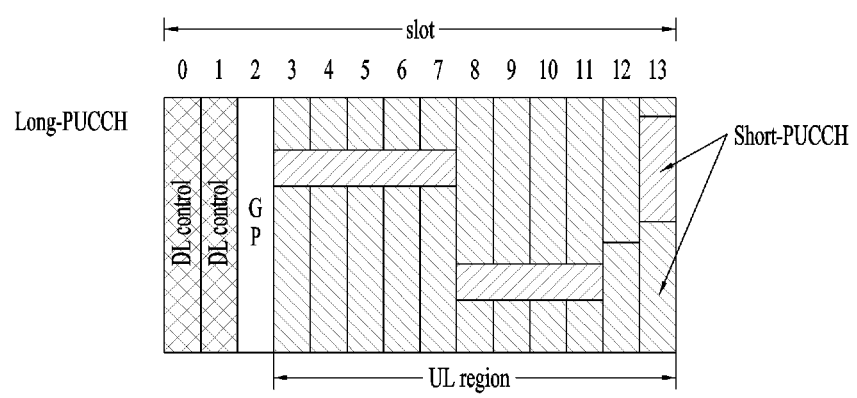
FIG. 6 is a diagram illustrating multiplexing of a long physical uplink control channel (PUCCH) and a short PUCCH in the NR system.

FIG. 6 illustrates exemplary multiplexing between a UL signal and short and long PUCCHs.

A PUCCH (e.g., PUCCH format 0/2) and a PUSCH may be multiplexed in time division multiplexing (TDM) or frequency division multiplexing (FDM). A short PUCCH and a long PUCCH from different UEs may be multiplexed in TDM or FDM. Short PUCCHs from a single UE may be multiplexed in TDM within one slot. A short PUCCH and a long PUCCH from a single UE may be multiplexed in TDM or FDM within one slot.

ACK/NACK Transmission

Figure 7:
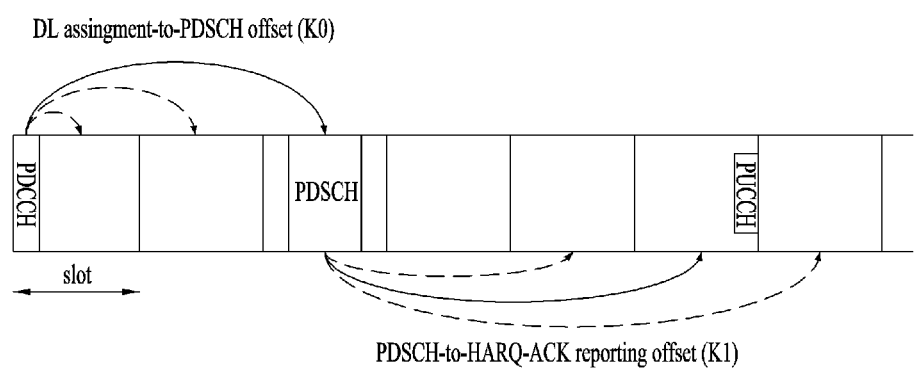
FIG. 7 is a diagram illustrating an exemplary acknowledgment/negative acknowledgment (ACK/NACK) transmission process.

FIG. 7 illustrates an ACK/NACK transmission procedure. Referring to FIG. 7, the UE may detect a PDCCH in slot #n. Here, the PDCCH includes DL scheduling information (e.g., DCI format 1_0 or 1_1). The PDCCH indicates a DL assignment-to-PDSCH offset (K0) and a PDSCH-HARQ-ACK reporting offset (K1). For example, DCI format 1_0 or 1_1 may include the following information.

Frequency domain resource assignment (FDRA): indicates an RB set assigned to the PDSCH.

Time domain resource assignment (TDRA): indicates K0 and the starting position (e.g. OFDM symbol index) and duration (e.g. the number of OFDM symbols) of the PDSCH in a slot. TDRA may be indicated by a start and length indicator value (SLIV).

PDSCH-to-HARQ_feedback timing indicator: indicates K1.

After receiving the PDSCH in slot #(n+K0) according to the scheduling information of slot #n, the UE may transmit UCI on the PUCCH in slot #(n+K1). The UCI includes an HARQ-ACK response to the PDSCH. In the case where the PDSCH is configured to transmit a maximum of one TB, the HARQ-ACK response may be configured in one bit. In the case where the PDSCH is configured to transmit a maximum of two TBs, the HARQ-ACK response may be configured in two bits if spatial bundling is not configured and may be configured in one bit if spatial bundling is configured. When slot #(n+K1) is designated as an HARQ-ACK transmission time for a plurality of PDSCHs, the UCI transmitted in slot #(n+K1) includes HARQ-ACK responses to the plurality of PDSCHs.

Figure 8:
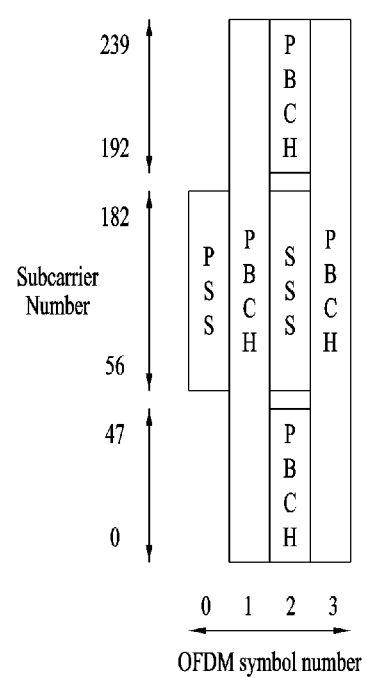
FIGS. 8 to 13 are diagrams illustrating the composition of a synchronization signal/physical broadcast channel (SS/PBCH) block and a method of transmitting an SS/PBCH block.

FIG. 8 is a diagram illustrating a synchronization signal block (SSB) structure. A UE may perform cell search, system information acquisition, beam alignment for initial access, DL measurement, and so on based on an SSB. The term SSB is interchangeably used with SS/PBCH block.

Referring to FIG. 8, an SSB includes a PSS, an SSS, and a PBCH. The SSB includes four consecutive OFDM symbols, which carry the PSS, PBCH, SSS/PBCH, and PBCH, respectively. Each of the PSS and the SSS includes one OFDM symbol by 127 subcarriers, and the PBCH includes three OFDM symbols by 576 subcarriers. Polar coding and quadrature phase shift keying (QPSK) are applied to the PBCH. The PBCH includes data REs and DMRS REs in each OFDM symbol. There are three DMRS REs per RB, with three data REs between every two adjacent DMRS REs.

Cell Search

Cell search is a process of acquiring time/frequency synchronization with a cell and detecting the cell ID (e.g., physical layer cell ID (PCID)) of the cell at a UE. The PSS is used to detect a cell ID in a cell ID group, and the SSS is used to detect the cell ID group. The PBCH is used to detect an SSB (time) index and a half-frame.

The cell search procedure of the UE may be summarized in Table 3 below.

TABLE 3

| | Type of Signals | Operations |
|---|---|---|
| $1^{st}$ step | PSS | SS/PBCH block (SSB) symbol timing acquisition Cell ID detection within a cell ID group (3 hypothesis) |
| $2^{nd}$ Step | SSS | Cell ID group detection (336 hypothesis) |
| $3^{rd}$ Step | PBCH DMRS | SSB index and Half frame (HF) index (Slot and frame boundary detection) |
| $4^{th}$ Step | PBCH | Time information (80 ms, System Frame Number (SFN), SSB index, HF) Remaining Minimum System Information (RMSI) Control resource set (CORESET)/Search space configuration |
| $5^{th}$ Step | PDCCH and PDSCH | Cell access information RACH configuration |

Figure 9:
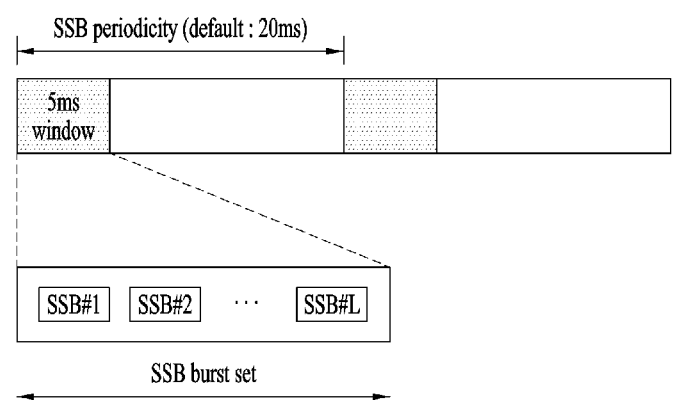

FIG. 9 illustrates exemplary SSB transmission.

Referring to FIG. 9, an SSB is transmitted periodically according to an SSB periodicity. A default SSB periodicity that the UE assumes during initial cell search is defined as 20 ms. After cell access, the SSB periodicity may be set to one of {5 ms, 10 ms, 20 ms, 40 ms, 80 ms, 160 ms} by a network (e.g., a BS). An SSB burst set is configured at the start of an SSB period. The SSB burst set includes a 5-ms time window (i.e., a half-frame), and an SSB may be transmitted up to L times in the SSB burst set. The maximum allowed transmission number L of an SSB may be given as follows according to the frequency band of a carrier. One slot includes up to two SSBs.

For frequency range of up to 3 GHz, L=4
For frequency range from 3 GHz to 6 GHz, L=8
For frequency range from 6 GHz to 52.6 GHz, L=64

The time positions of SSB candidates in an SS burst set may be defined as follows according to SCSs. The time positions of SSB candidates are indexed with (SSB indexes) 0 to L-1 in time order in the SSB burst set (i.e., half-frame).

Case A—15-kHz SCS: The indexes of the first symbols of candidate SSBs are given as {2, 8}+14*n where n=0, 1 for a carrier frequency equal to or lower than 3 GHz, and n=0, 1, 2, 3 for a carrier frequency of 3 GHz to 6 GHz.

Case B—30-kHz SCS: The indexes of the first symbols of candidate SSBs are given as {4, 8, 16, 20}+28*n where n=0 for the carrier frequency equal to or lower than 3 GHz, and n=0, 1 for the carrier frequency of 3 GHz to 6 GHz.

Case C—30-kHz SCS: The indexes of the first symbols of candidate SSBs are given as {2, 8}+14*n where n=0, 1 for the carrier frequency equal to or lower than 3 GHz, and n=0, 1, 2, 3 for the carrier frequency of 3 GHz to 6 GHz.

Case D—120-kHz SCS: The indexes of the first symbols of candidate SSBs are given as {4, 8, 16, 20}+28*n where n=0, 1, 2, 3, 5, 6, 7, 8, 10, 11, 12, 13, 15, 16, 17, 18 for a carrier frequency above 6 GHz.

Case E—240-kHz SCS: The indexes of the first symbols of candidate SSBs are given as {8, 12, 16, 20, 32, 36, 40, 44}+56*n where n=0, 1, 2, 3, 5, 6, 7, 8 for the carrier frequency above 6 GHz.

Figure 10:
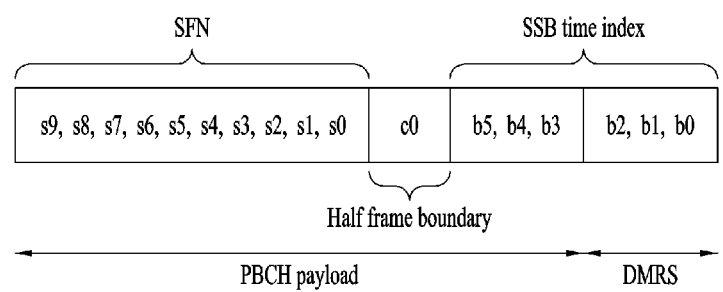

FIG. 10 illustrates acquisition of DL time synchronization information at a UE.

The UE may acquire DL synchronization by detecting an SSB. The UE may identify the structure of an SSB burst set based on the index of the detected SSB and thus detect a symbol, slot, or half-frame boundary. The number of a frame or half-frame to which the detected SSB belongs to may be identified by SFN information and half-frame indication information.

Specifically, the UE may acquire 10-bit SFN system information s0 to s9 from the PBCH. 6 bits out of the 10-bit SFN information is obtained from a master information block (MIB), and the remaining 4 bits are obtained from a PBCH TB.

The UE may then acquire 1-bit half-frame indication information c0. When a carrier frequency is 3 GHz or below, the half-frame indication information may be signaled implicitly by a PBCH DMRS. The PBCH DMRS uses one of 8 PBCH DMRS sequences to indicate 3-bit information. Therefore, when L=4, the remaining one bit except for bits indicating an SSB index among 3 bits that may be indicated by the 8 PBCH DMRS sequences may be used as a half-frame indication.

Finally, the UE may acquire an SSB index based on the DMRS sequence and PBCH payload. SSB candidates are indexed with 0 to L-1 in time order in an SSB burst set (i.e., half-frame). When L=8 or L=64, three least significant bits (LSBs) b0, b1 and b2 of an SSB index may be indicated by 8 different PBCH DMRS sequences. When L=64, three most significant bits (MSBs) b3, b4 and b5 of the SSB index are indicated by the PBCH. When L=2, two LSBs b0 and b1 of the SSB index may be indicated by 4 different PBCH DMRS sequences. When L=4, the remaining one bit b2 except for the bits indicating the SSB index among the three bits may be used as a half-frame indication.

System Information Acquisition

Figure 11:
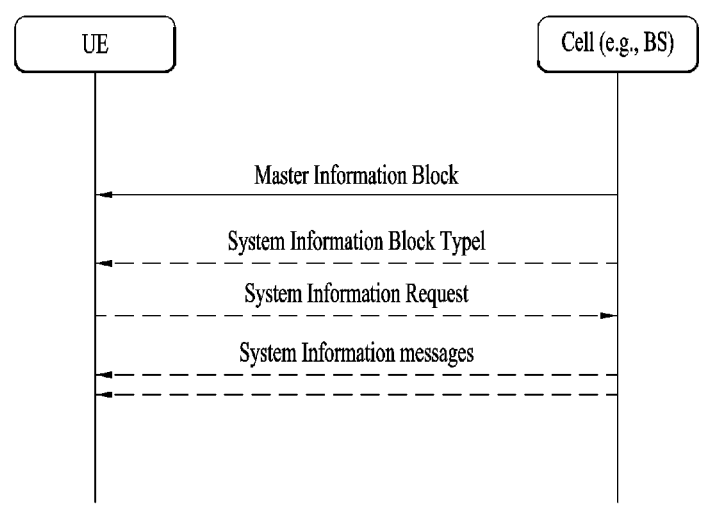

FIG. 11 illustrates a system information (SI) acquisition procedure. The UE may acquire access stratum (AS)-/non-access stratum (NAS)-information in the SI acquisition procedure. The SI acquisition procedure may be applied to UEs in RRC_IDLE, RRC_INACTIVE, and RRC_CONNECTED states.

SI is divided into a master information block (MIB) and a plurality of system information blocks (SIB s). The MIB and the plurality of SIBs are further divided into minimum SI and other SI. The minimum SI may include the MIB and systemInformationBlock1 (SIB1), carrying basic information required for initial access and information required to acquire the other SI. SIB1 may also be referred to as remaining minimum system information (RMSI). For details, the following may be referred to.

- The MIB includes information/parameters related to reception of SIB1 and is transmitted on the PBCH of an SSB. The UE assumes that a half-frame including an SSB is repeated every 20 ms during initial cell selection. The UE may determine from the MIB whether there is any control resource set (CORESET) for a Type0-PDCCH common search space. The Type0-PDCCH common search space is a kind of PDCCH search space and used to transmit a PDCCH that schedules an SI message. In the presence of a Type0-PDCCH common search space, the UE may determine (1) a plurality of contiguous RBs and one or more consecutive symbols included in a CORESET, and (ii) a PDCCH occasion (e.g., a time-domain position at which a PDCCH is to be received), based on information (e.g., pdcch-ConfigSIB1) included in the MIB. In the absence of a Type0-PDCCH common search space, pdcch-ConfigSIB1 provides information about a frequency position at which the SSB/SIB1 exists and information about a frequency range without any SSB/SIB 1.
- SIB1 includes information related to availability and scheduling (e.g., a transmission periodicity and an SI-window size) of the remaining SIBs (hereinafter, referred to as SIBx where x is an integer equal to or larger than 2). For example, SIB1 may indicate whether SIBx is broadcast periodically or in an on-demand manner upon UE request. If SIBx is provided in the on-demand manner, SIB1 may include information required for the UE to transmit an SI request. A PDCCH that schedules SIB1 is transmitted in the Type0-PDCCH common search space, and SIB1 is transmitted on a PDSCH indicated by the PDCCH.
- SIBx is included in an SI message and transmitted on a PDSCH. Each SI message is transmitted within a periodic time window (i.e., SI-window).

Beam Alignment

Figure 12:
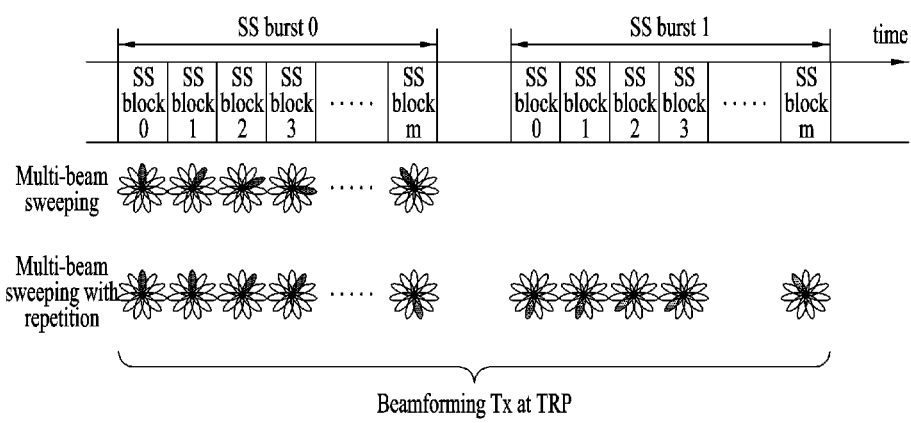

FIG. 12 illustrates exemplary multi-beam transmission of SSBs.

Beam sweeping refers to changing the beam (direction) of a wireless signal over time at a transmission reception point (TRP) (e.g., a BS/cell) (hereinafter, the terms beam and beam direction are interchangeably used). An SSB may be transmitted periodically by beam sweeping. In this case, SSB indexes are implicitly linked to SSB beams. An SSB beam may be changed on an SSB (index) basis or on an SS (index) group basis. In the latter, the same SSB beam is maintained in an SSB (index) group. That is, the transmission beam direction of an SSB is repeated for a plurality of successive SSBs. The maximum allowed transmission number L of an SSB in an SSB burst set is 4, 8 or 64 according to the frequency band of a carrier. Accordingly, the maximum number of SSB beams in the SSB burst set may be given according to the frequency band of a carrier as follows.

For frequency range of up to 3 GHz, maximum number of beams=4

For frequency range from 3 GHz to 6 GHz, maximum number of beams=8

For frequency range from 6 GHz to 52.6 GHz, maximum number of beams =64

* Without multi-beam transmission, the number of SSB beams is 1.

When the UE attempts initial access to the BS, the UE may align beams with the BS based on an SSB. For example, the UE performs SSB detection and then identifies a best SSB. Subsequently, the UE may transmit an RACH preamble in PRACH resources linked/corresponding to the index (i.e., beam) of the best SSB. The SSB may also be used for beam alignment between the BS and the UE even after the initial access.

Channel Measurement and Rate Matching

FIG. 12 illustrates an exemplary method of indicating actually transmitted SSBs, SSB_tx.

Up to L SSBs may be transmitted in an SSB burst set, and the number and positions of actually transmitted SSBs may be different for each BS or cell. The number and positions of actually transmitted SSBs are used for rate-matching and measurement, and information about actually transmitted SSBs is indicated as follows.

Figure 13:
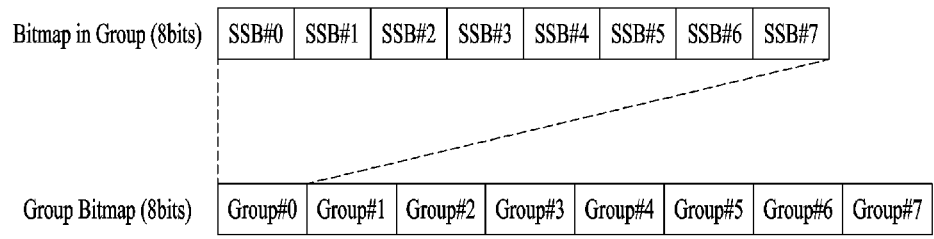

- If the information is related to rate matching, the information may be indicated by UE-specific RRC signaling or RMSI. The UE-specific RRC signaling includes a full bitmap (e.g., of length L) for frequency ranges below and above 6 GHz. The RMSI includes a full bitmap for a frequency range below 6 GHz and a compressed bitmap for a frequency range above 6 GHz, as illustrated in FIG. 13. Specifically, the information about actually transmitted SSBs may be indicated by a group-bitmap (8 bits)+an in-group bitmap (8 bits). Resources (e.g., REs) indicated by the UE-specific RRC signaling or the RMSI may be reserved for SSB transmission, and a PDSCH and/or a PUSCH may be rate-matched in consideration of the SSB resources.
- If the information is related to measurement, the network (e.g., BS) may indicate an SSB set to be measured within a measurement period, when the UE is in RRC connected mode. The SSB set may be indicated for each frequency layer. Without an indication of an SSB set, a default SSB set is used. The default SSB set includes all SSBs within the measurement period. An SSB set may be indicated by a full bitmap (e.g., of length L) in RRC signaling. When the UE is in RRC idle mode, the default SSB set is used.

Figure 14:
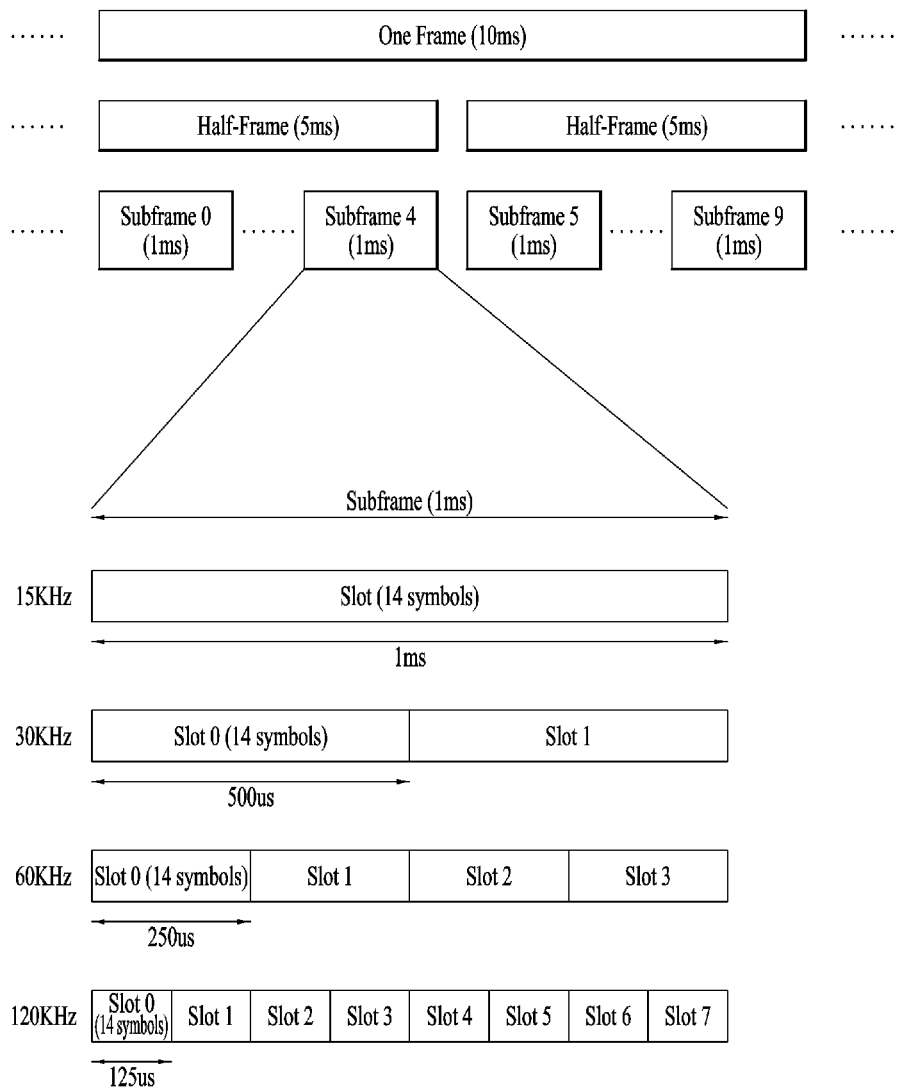
FIGS. 14 to 16 are diagrams illustrating a radio frame structure and a slot structure in the NR system.

FIG. 14 illustrates a radio frame structure in NR.

In NR, UL and DL transmissions are configured in frames. Each radio frame has a length of 10ms and is divided into two 5-ms half-frames. Each half-frame is divided into five 1-ms subframes. A subframe is divided into one or more slots, and the number of slots in a subframe depends on an SCS. Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may be an OFDM symbol (or a CP-OFDM symbol) and an SC-FDMA symbol (or a discrete Fourier transform-spread-OFDM (DFT-s-OFDM) symbol).

Table 4 exemplarily illustrates that the number of symbols per slot, the number of slots per frame, and the number of slots per subframe vary according to SCSs when the normal CP is used.

TABLE 4

| SCS ($15*2^u$) | $N_{symb}^{slot}$ | $N_{slot}^{frame,u}$ | $N_{slot}^{subframe,u}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*Nslotsymb: Number of symbols in a slot
*Nframe,uslot: Number of slots in a frame
*Nsubframe,uslot: Number of slots in a subframe Table 5 illustrates that the number of symbols per slot, the number of slots per frame, and the number of slots per subframe vary according to SCSs when the extended CP is used.

TABLE 5

| SCS ($15*2^u$) | $N_{symb}^{slot}$ | $N_{slot}^{frame,u}$ | $N_{slot}^{subframe,u}$ |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for simplicity, referred to as a time unit (TU)) composed of the same number of symbols may be configured differently between the aggregated cells.

Figure 15:
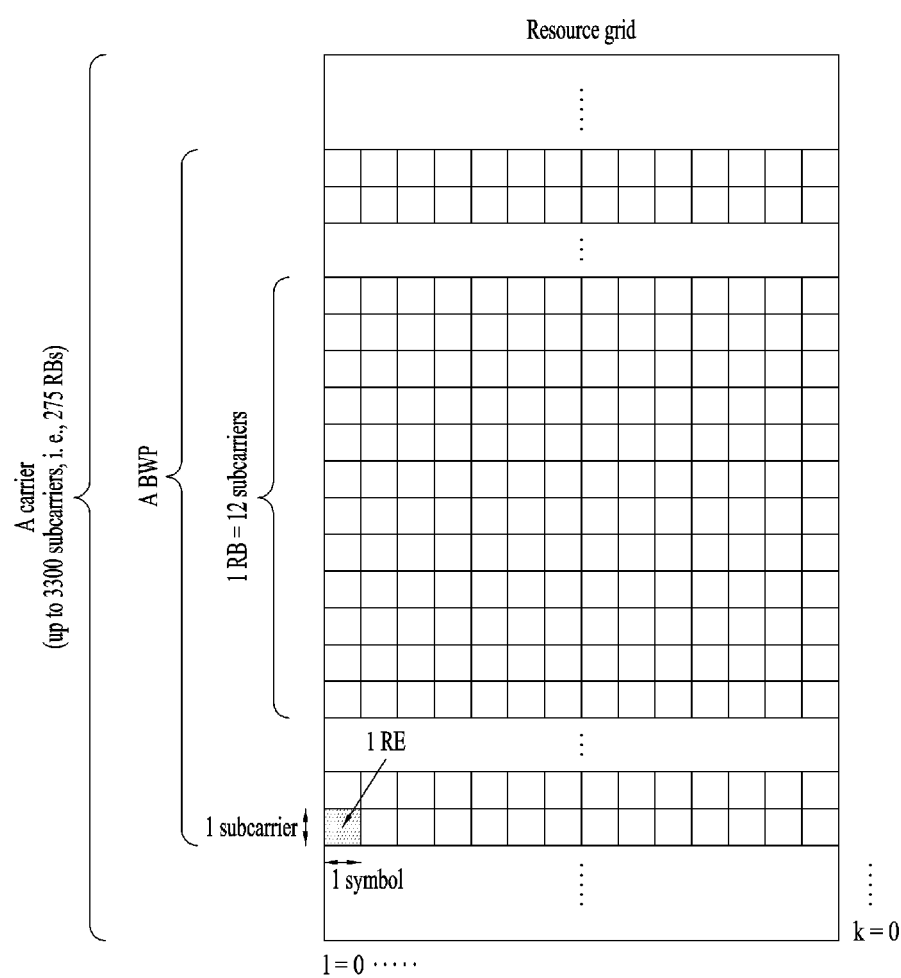

FIG. 15 illustrates a slot structure in an NR frame. A slot includes a plurality of symbols in the time domain. For example, one slot includes 14 symbols in a normal CP case and 12 symbols in an extended CP case. A carrier includes a plurality of subcarriers in the frequency domain A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 4) BWPs. Data communication may be conducted in an active BWP, and only one BWP may be activated for one UE. Each element in a resource grid may be referred to as an RE, to which one complex symbol may be mapped.

Figure 16:
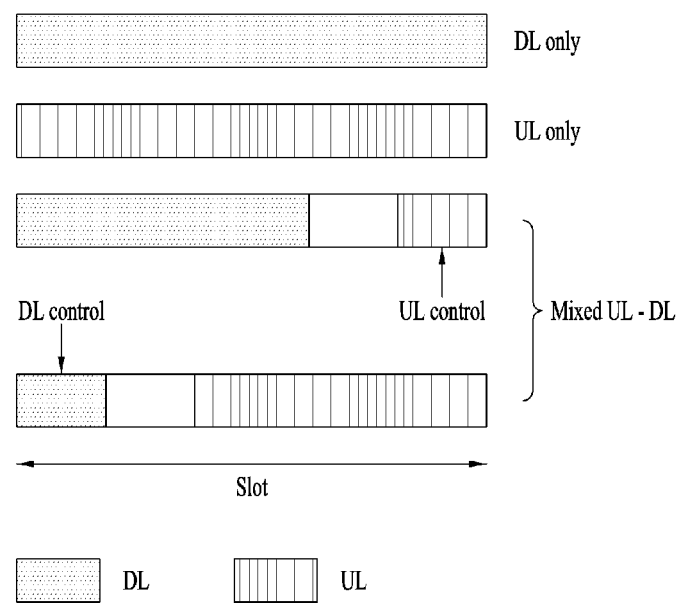

FIG. 16 illustrates the structure of a self-contained slot. In the NR system, a frame has a self-contained structure in which a DL control channel, DL or UL data, and a UL control channel may all be included in one slot. For example, the first N symbols (hereinafter, referred to as a DL control region) in a slot may be used to transmit a DL control channel, and the last M symbols (hereinafter, referred to as a UL control region) in the slot may be used to transmit a UL control channel. N and M are integers equal to or greater than 0. A resource region (hereinafter, referred to as a data region) between the DL control region and the UL control region may be used for DL data transmission or UL data transmission. For example, the following configurations may be considered. The periods are listed in time order.

1. DL only configuration
    2. UL only configuration
    3. Mixed UL-DL configuration
    DL region+guard period (GP)+UL control region
    DL control region+GP+UL region
    * DL region: (i) DL data region or (ii) DL control region+DL data region
    * UL region: (i) UL data region or (ii) UL data region+UL control region A PDCCH may be transmitted in the DL control region, and a PDSCH may be transmitted in the DL data region. A PUCCH may be transmitted in the UL control region, and a PUSCH may be transmitted in the UL data region. The PDCCH may carry DCI, for example, DL data scheduling information and UL data scheduling information. The PUCCH may carry UCI, for example, ACK/NACK information for DL data, CSI, and a scheduling request (SR). The GP provides a time gap in the process of switching from the transmission mode to the reception mode or from the reception mode to the transmission mode at the BS and the UE. Some symbols at the time of switching from DL to UL in a subframe may be configured as the GP.

Bandwidth Part (BWP)

In the NR system, up to 400 MHz per carrier may be supported. When a UE operating in such a wideband carrier always operates with a radio frequency (RF) module for the entire carrier turned on, battery consumption of the UE may increase. Alternatively, considering various use cases (e.g., eMBB, URLLC, mMTC, and so on) operating within a single wideband carrier, a different numerology (e.g., SCS) may be supported for each frequency band within the carrier. Alternatively, each UE may have a different maximum bandwidth capability. In this regard, the BS may indicate to the UE to operate only in a partial bandwidth instead of the total bandwidth of the wideband carrier. The partial bandwidth may be defined as a BWP. A BWP is a subset of contiguous common RBs defined for numerology ui in BWP i on the carrier, and one numerology (e.g., SCS, CP length, or slot or mini-slot duration) may be configured for the BWP.

The BS may configure one or more BWPs in one carrier configured for the UE. Alternatively, when UEs are concentrated on a specific BWP, the BS may configure another BWP for some of the UEs, for load balancing. Alternatively, the BS may exclude some spectrum of the total bandwidth and configure both-side BWPs of the cell in the same slot in consideration of frequency-domain inter-cell interference cancellation between neighboring cells. That is, the BS may configure at least one DL/UL BWP for a UE associated with the wideband carrier, activate at least one of DL/UL BWP(s) configured at a specific time point (by L1 signaling being a physical-layer control signal, a MAC control element (CE) being a MAC-layer control signal, or RRC signaling), or set a timer value and switch the UE to a predetermined DL/UL BWP, upon expiration of the timer. To indicate switching to another configured DL/UL BWP, DCI format 1_1 or DCI format 0_1 may be used. The activated DL/UL BWP may be referred to as an active DL/UL BWP. During initial access or before an RRC connection setup, the UE may not receive a configuration for a DL/UL BWP from the BS. A DL/UL BWP that the UE assumes in this situation is defined as an initial active DL/UL BWP.

A DL BWP is a BWP in which a DL signal such as a PDCCH and/or a PDSCH is transmitted and received, whereas a UL BWP is a BWP in which a UL signal such as a PUCCH and/or a PUSCH is transmitted and received.

In the NR system, a DL channel and/or a DL signal may be transmitted and received in an active DL BWP. Further, a UL channel and/or a UL signal may be transmitted and received in an active UL BWP.

DL Channel Structures

A BS transmits related signals on later-described DL channels to a UE, and the UE receives the related signals on the DL channels from the BS.

(1) Physical Downlink Shared Channel (PDSCH)

The PDSCH delivers DL data (e.g., a DL-SCH TB) and adopts a modulation scheme such as quadrature phase shift keying (QPSK), 16-ary quadrature amplitude modulation (16 QAM), 64-ary QAM (64 QAM), or 256-ary QAM (256 QAM). A TB is encoded to a codeword. The PDSCH may deliver up to two codewords. The codewords are individually subjected to scrambling and modulation mapping, and modulation symbols from each codeword are mapped to one or more layers. An OFDM signal is generated by mapping each layer together with a DMRS to resources, and transmitted through a corresponding antenna port.

(2) Physical Downlink Control Channel (PDCCH)

The PDCCH delivers DCI and adopts QPSK as a modulation scheme. One PDCCH includes 1, 2, 4, 8, or 16 control channel elements (CCEs) according to its aggregation level (AL). One CCE includes 6 resource element groups (REGs), each REG being defined by one OFDM symbol by one (P)RB.

Figure 17:
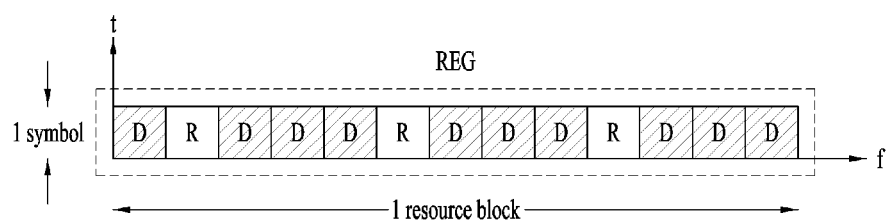
FIGS. 17 to 19 are diagrams illustrating a physical downlink control channel (PDCCH) in the NR system.

FIG. 17 illustrates an exemplary structure of one REG. In FIG. 17, D represents an RE to which DCI is mapped, and R represents an RE to which a DMRS is mapped. The DMRS is mapped to RE #1, RE #5, and RE #9 along the frequency direction in one symbol.

The PDCCH is transmitted in a CORESET. A CORESET is defined as a set of REGs with a given numerology (e.g., an SCS, a CP length, or the like). A plurality of CORESETs for one UE may overlap with each other in the time/frequency domain. A CORESET may be configured by system information (e.g., an MIB) or UE-specific higher-layer signaling (e.g., RRC signaling). Specifically, the number of RBs and the number of symbols (3 at maximum) in the CORESET may be configured by higher-layer signaling.

For each CORESET, a precoder granularity in the frequency domain is set to one of the followings by higher-layer signaling:

sameAsREG-bundle: It equals to an REG bundle size in the frequency domain.

allContiguousRBs: It equals to the number of contiguous RBs in the frequency domain within the CORESET.

The REGs of the CORESET are numbered in a time-first mapping manner That is, the REGs are sequentially numbered in an ascending order, starting from 0 for the first OFDM symbol of the lowest-numbered RB in the CORESET.

Figure 18:
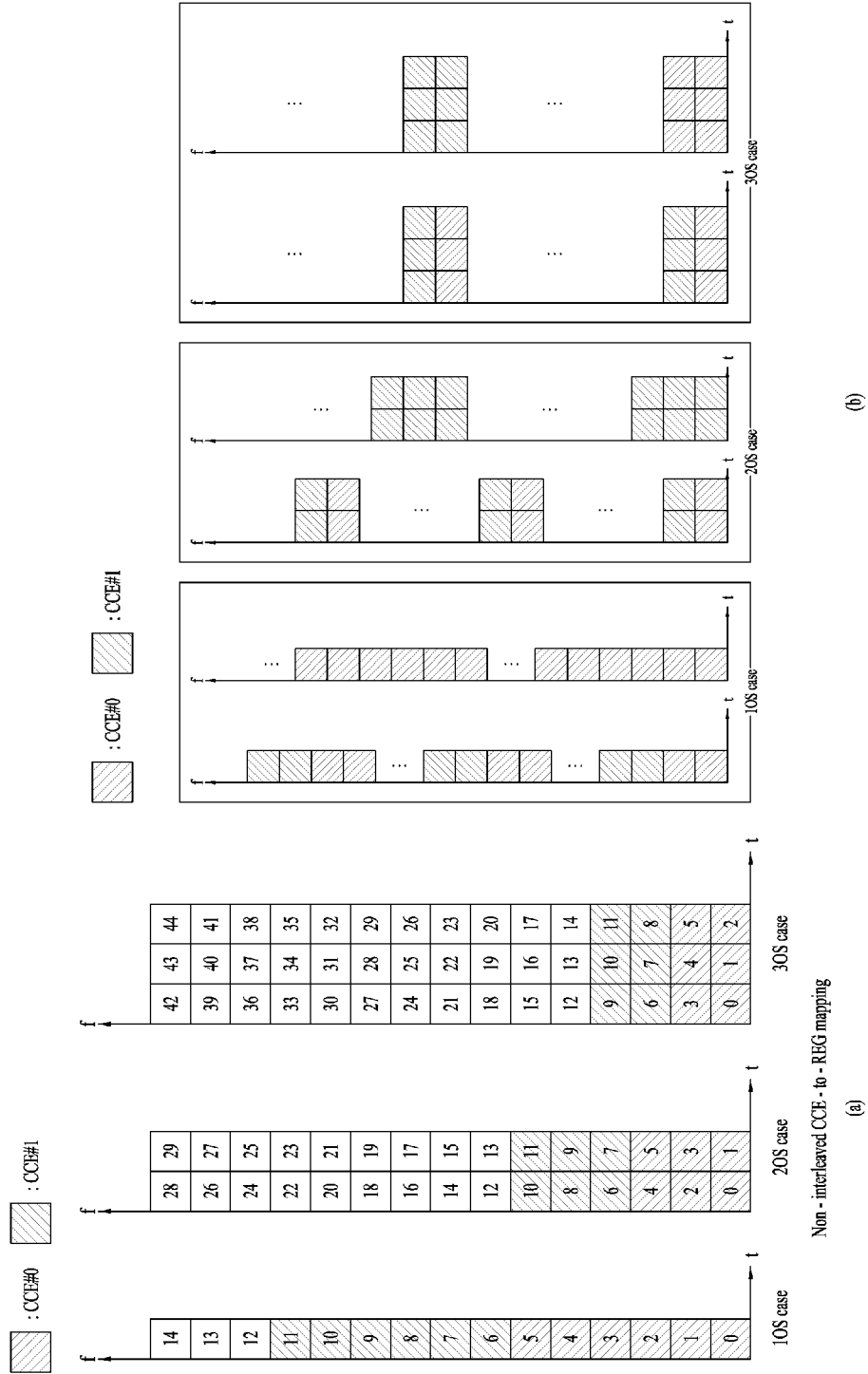

CCE-to-REG mapping for the CORESET may be an interleaved type or a non-interleaved type. FIG. 18(a) is a diagram illustrating non-interleaved CCE-REG mapping, and FIG. 18(b) is a diagram illustrating interleaved CCE-REG mapping.

Non-interleaved CCE-to-REG mapping (or localized CCE-to-REG mapping): 6 REGs for a given CCE are grouped into one REG bundle, and all of the REGs for the given CCE are contiguous. One REG bundle corresponds to one CCE.

Interleaved CCE-to-REG mapping (or distributed CCE-to-REG mapping): 2, 3 or 6 REGs for a given CCE are grouped into one REG bundle, and the REG bundle is interleaved in the CORESET. In a CORESET including one or two OFDM symbols, an REG bundle includes 2 or 6 REGs, and in a CORESET including three OFDM symbols, an REG bundle includes 3 or 6 REGs. An REG bundle size is configured on a CORESET basis.

Figure 19:
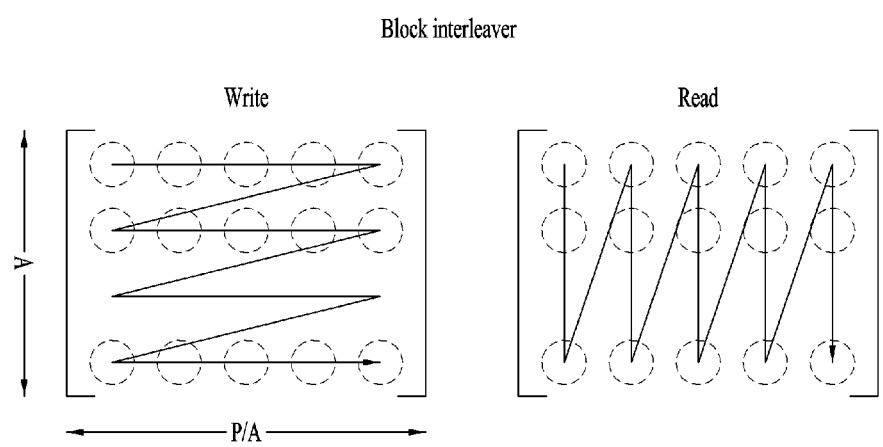

FIG. 19 illustrates an exemplary block interleaver. For the above interleaving operation, the number A of rows in a (block) interleaver is set to one or 2, 3, and 6. When the number of interleaving units for a given CORESET is P, the number of columns in the block interleaver is P/A. In the block interleaver, a write operation is performed in a row-first direction, and a read operation is performed in a column-first direction, as illustrated in FIG. 19. Cyclic shift (CS) of an interleaving unit is applied based on an ID which is configurable independently of a configurable ID for the DMRS.

The UE acquires DCI delivered on a PDCCH by decoding (so-called blind decoding) a set of PDCCH candidates. A set of PDCCH candidates decoded by a UE are defined as a PDCCH search space set. A search space set may be a common search space or a UE-specific search space. The UE may acquire DCI by monitoring PDCCH candidates in one or more search space sets configured by an MIB or higher-layer signaling. Each CORESET configuration is associated with one or more search space sets, and each search space set is associated with one CORESET configuration. One search space set is determined based on the following parameters.

controlResourceSetId: A set of control resources related to the search space set.

monitoringSlotPeriodicityAndOffset: A PDCCH monitoring periodicity (in slots) and a PDCCH monitoring offset (in slots).

monitoringSymbolsWithinSlot: A PDCCH monitoring pattern (e.g., the first symbol(s) in the CORESET) in a PDCCH monitoring slot.

nrofCandidates: The number of PDCCH candidates (one of 0, 1, 2, 3, 4, 5, 6, and 8) for each AL={1, 2, 4, 8, 16}.

Table 6 lists features of the respective search space types.

TABLE 6

| Type | Search Space | RNTI | Use Case |
| --- | --- | --- | --- |
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg 2, Msg 4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 7 lists exemplary DCI formats transmitted on the PDCCH.

TABLE 7

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

Random Access (or RACH) Procedure

Figure 20:
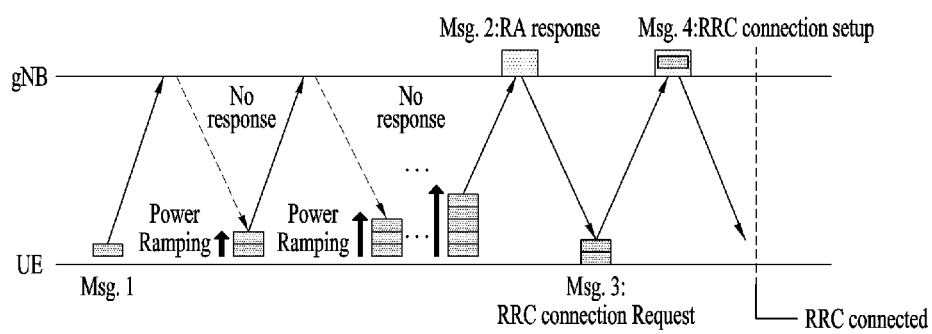
FIG. 20 are diagrams illustrating exemplary random access procedures (or random access channel (RACH) procedures)

FIG. 20 is a diagram illustrating an example of a random access channel (RACH) procedure. In particular, FIG. 20 illustrates an example of a contention-based random access channel (RACH) procedure.

First, the UE may transmit an RACH preamble as Msg 1 on a PRACH in an RACH procedure.

Random access preamble sequences of two different lengths are supported. The length 839 of the longer sequence is applied to the SCSs of 1.25 kHz and 5 kHz, whereas the length 139 of the shorter sequence is applied to the SCSs of 15 kHz, 30 kHz, 60 kHz, and 120 kHz.

Multiple preamble formats are defined by one or more RACH OFDM symbols and different CPs (and/or guard times). An RACH configuration for an initial bandwidth of a Pcell is provided in system information of the cell to the UE. The RACH configuration includes information about a PRACH SCS, available preambles, and a preamble format. The RACH configuration includes information about associations between SSBs and RACH (time-frequency) resources. The UE transmits an RACH preamble in RACH time-frequency resources associated with a detected or selected SSB.

An SSB threshold for RACH resource association may be configured by the network, and an RACH preamble is transmitted or retransmitted based on an SSB having a reference signal received power (RSRP) measurement satisfying the threshold. For example, the UE may select one of SSBs satisfying the threshold, and transmit or retransmit an RACH preamble in RACH resources associated with the selected SSB. For example, upon retransmission of the RACH preamble, the UE may reselect any one of SSB(s), may retransmit the RACH preamble based on RACH resources associated with the reselected SSB. That is, the RACH resources for retransmission of the RACH preamble may be the same and/or different from RACH resources for transmission of the RACH preamble.

Upon receipt of the RACH preamble from the UE, the BS transmits an RAR message (Msg 2) to the UE. A PDCCH that schedules a PDSCH carrying the RAR is cyclic redundancy check (CRC)-masked by a random access radio network temporary identifier (RA-RNTI) and transmitted. Upon detection of the PDCCH masked by the RA-RNTI, the UE may receive an RAR on a PDSCH scheduled by DCI carried on the PDCCH. The UE determines whether the RAR includes RAR information for its transmitted preamble, that is, Msg 1. The UE may make the determination by checking the presence or absence of the RACH preamble ID of its transmitted preamble in the RAR. In the absence of the response to Msg 1, the UE may retransmit the RACH preamble a predetermined number of or fewer times, while performing power ramping. The UE calculates PRACH transmission power for a preamble retransmission based on the latest path loss and a power ramping counter.

The RAR information may include the preamble sequence transmitted by the UE, a cell RNTI (C-RNTI) that the BS has allocated to the UE attempting random access, UL transmit time alignment information, UL transmission power adjustment information, and UL radio resource allocation information. Upon receipt of its RAR information on the PDSCH, the UE may acquire time advance information for UL synchronization, an initial UL grant, and a temporary C-RNTI. The timing advance information is used to control a UL signal transmission timing. To align a PUSCH and/or PUCCH transmission of the UE with a subframe timing of a network end, the network (e.g., the BS) may measure the time difference between PUSCH, PUCCH, or SRS reception and a subframe and transmit the timing advance information based on the time difference. The UE may transmit a UL signal as Msg 3 of the RACH procedure on a UL-SCH based on the RAR information. Msg 3 may include an RRC connection request and a UE ID. The network may transmit Msg 4 in response to Msg 3. Msg 4 may be handled as a contention resolution message on DL. As the UE receives Msg 4, the UE may enter the RRC_CONNECTED state.

Meanwhile, the contention-free random access channel (RACH) procedure may be performed when the UE is handed over to another cell or BS, or may be performed when requested by a command of the BS. The basic procedure of the contention-free random access channel (RACH) procedure is similar to the contention-based random access channel (RACH) procedure. However, unlike the contention-based random access channel (RACH) procedure in which a UE randomly selects a preamble to be used among a plurality of random access preambles, a preamble (hereinafter referred to as a dedicated random access preamble) to be used by the UE is allocated to the UE by the BS in the contention-free random access channel (RACH) procedure. Information for the dedicated random access preamble may be included in an RRC message (e.g., a handover command) or may be provided to the UE via a PDCCH order. When the random access channel (RACH) procedure is initiated, the UE sends the dedicated random access preamble to the BS. If the UE receives information about the random access channel (RACH) procedure from the BS, the random access channel (RACH) procedure is completed.

As described before, the UL grant included in the RAR schedules a PUSCH transmission for the UE. A PUSCH carrying an initial UL transmission based on the UL grant of the RAR is referred to as an Msg 3 PUSCH. The contents of the RAR UL grant start from the MSB and ends in the LSB, given as Table 8.

TABLE 8

| RAR UL grant field | Number of bits |
| --- | --- |
| Frequency hopping flag | 1 |
| Msg3 PUSCH frequency resource allocation | 12 |
| Msg3 PUSCH time resource allocation | 4 |
| Modulation and coding scheme (MCS) | 4 |
| Transmit power control (TPC) for Msg3 PUSCH | 3 |
| CSI request | 1 |

The transmit power control (TPC) command is used to determine the transmission power of the Msg 3 PUSCH. For example, the TPC command is interpreted according to Table 9.

TABLE 9

| TPC command | value [dB] |
| --- | --- |
| 0 | −6 |
| 1 | −4 |
| 2 | −2 |
| 3 | 0 |
| 4 | 2 |
| 5 | 4 |
| 6 | 6 |
| 7 | 8 |

In the contention-free RACH procedure, a CSI request field in an RAR UL grant indicates whether the UE is to include an aperiodic CSI report in a corresponding PUSCH transmission. An SCS for Msg 3 PUSCH transmission is provided by an RRC parameter. The UE may transmit the PRACH and the Msg 3 PUSCH on the same UL carrier of the same serving cell. A UL BWP for the Msg 3 PUSCH transmission is indicated by SIB1 (SystemInformation-Block1).

Before a detailed description, implementation examples of operations of a UE and a BS according to an embodiment of the present disclosure will be described below with reference to FIGS. 21 and 22.

Figure 21:
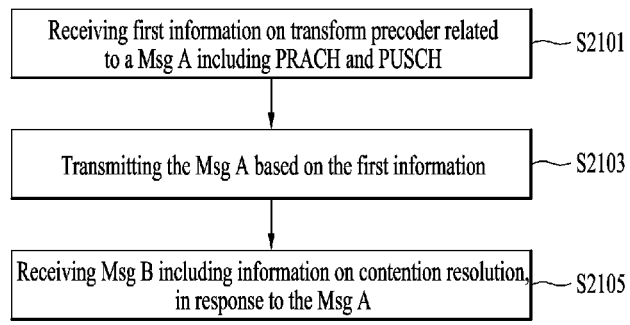
FIGS. 21 and 22 are diagrams illustrating specific implementation examples of operations of a user equipment (UE) and a base station (BS) according to an embodiment of the present disclosure.

FIG. 21 is a diagram illustrating an example of operations of the user equipment (UE). Referring to FIG. 21, the UE may receive first information for a transform precoder related to the message A (Msg A) including a Physical Random Access Channel (PRACH) and a Physical Uplink Shared Channel (PUSCH) (S2101). Thereafter, the UE may transmit the message A to the BS based on the first information (S2103), and may receive the message B including contention resolution information as a response to the message A (S2105). In this case, a detailed method for performing the RACH procedure by the UE in steps S2101 to S2105 may be based on the following embodiments and features described below.

The UE illustrated in FIG. 21 may be one of various wireless devices illustrated in FIGS. 26 to 29. For example, the UE of FIG. 21 may be a first wireless device 100 illustrated in FIG. 21 or a wireless device 100 or 200 illustrated in FIG. 27. In other words, the operation of FIG. 21 may be performed by one of the various wireless devices illustrated in FIGS. 26 to 29.

Figure 22:
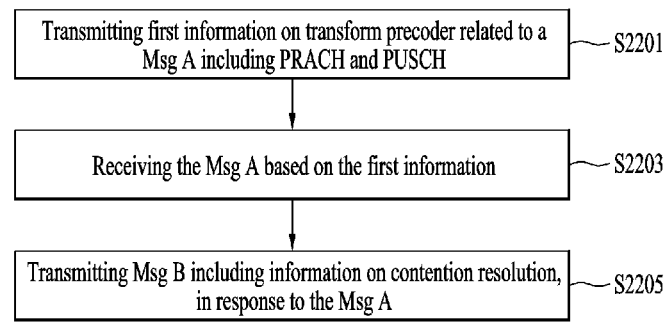

FIG. 22 is a diagram illustrating an example of operations of the base station (BS). Referring to FIG. 22, the BS may transmit first information for a transform precoder related to the message A (Msg A) including a Physical Random Access Channel (PRACH) and a Physical Uplink Shared Channel (PUSCH) (S2201). Thereafter, the BS may receive the message A transmitted based on the first information (S2203), and may transmit the message B including contention resolution information as a response to the message A (S2205). In this case, a detailed method for performing the RACH procedure by the BS in steps S2201 to S2205 may be based on the following embodiments and features described below.

The BS illustrated in FIG. 22 may be one of various wireless devices illustrated in FIGS. 26 to 29. For example, the BS of FIG. 22 may be a second wireless device 200 illustrated in FIG. 22 or the wireless device 100 or 200 illustrated in FIG. 27. In other words, the operation of FIG. 22 may be performed by one of the various wireless devices illustrated in FIGS. 26 to 29.

In the LTE and/or NR system, a UE may perform a UL transmission by an RACH procedure without being scheduled for the UL transmission directly by a given BS or cell. From the perspective of the UE, the RACH procedure in the LTE and/or NR system is a 4-step procedure including 1) random access preamble transmission, 2) reception of Msg 2 corresponding to an RAR, 3) transmission of Msg 3 including a PUSCH, and 4) reception of Msg 4 including contention resolution information.

Msg 2 is a message by which the BS allocates UL resources to be used for transmission of Msg 3 from the UE which has transmitted a preamble, upon receipt of the preamble. The UE may transmit its identification information such as an IMSI or a TMSI and information about a connection request by Msg 3. Upon receipt of Msg 3, the BS transmits the identification information of the UE and information required for random access in Msg 4, thereby preventing collision between different UEs during the RACH procedure and completing the RACH procedure for the UE.

Compared to legacy LTE and NR Rel-15 in which the RACH procedure is performed in four steps as described above, the 2-step RACH procedure is under study to reduce the processing delay of the 4-step RACH procedure and use the RACH procedure even in a small cell or an unlicensed bandwidth in the newly introduced NR Rel-6. The 2-step RACH procedure does not include the step of transmitting Msg 3 and the step of transmitting Msg 4 including a contention resolution message. Instead, the UE transmits both a message corresponding to Msg 3 and a preamble as Msg A to the BS in the first step of the RACH procedure, and the BS transmits both a message corresponding to Msg 4 and an RAR as Msg B in response to Msg A to the UE. Upon receipt of Msg B, the UE completes the RACH procedure by decoding Msg B and then performs data transmission and reception.

Figure 23:
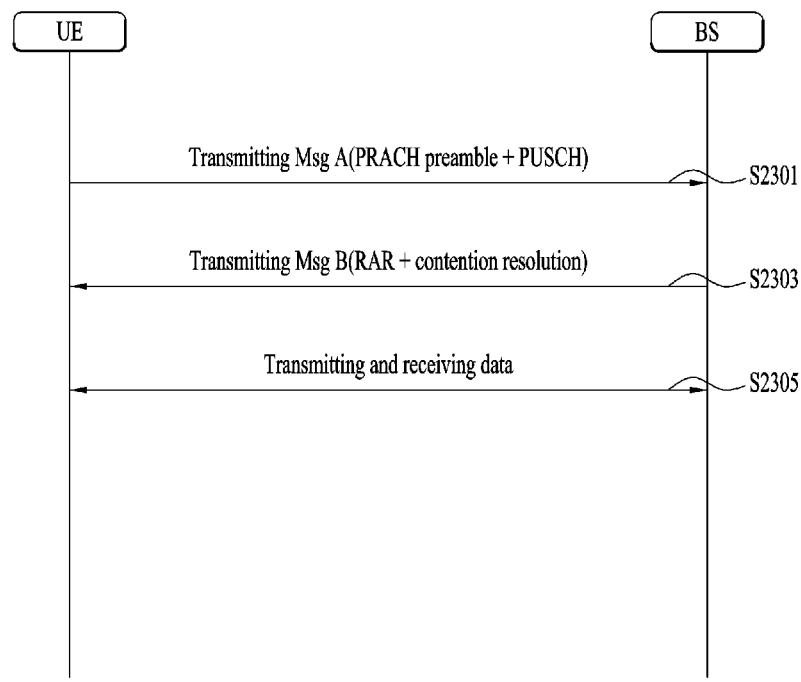
FIG. 23 is a diagram illustrating a basic process of a 2-step RACH.

FIG. 23 is a diagram illustrating a basic process of a 2-step RACH. Referring to FIG. 23, upon receiving the RACH transmission information included in system information being broadcast from the BS, the UE may transmit the message A (Msg A) including both the RACH preamble (or PRACH preamble) and the PUSCH to perform the random access channel (RACH) procedure for the BS (S2301). In this case, the RACH preamble and the PUSCH may be transmitted in a time domain at intervals of a constant gap therebetween, or may be consecutively transmitted in a time domain. The corresponding PUSCH may include identifier (ID) information of the UE. The base station may detect a preamble, and may predict and receive a PUSCH and consecutive PUSCHs having the corresponding gap from the RACH preamble. After receiving the access request and/or response from a higher layer on the basis of the UE ID information transmitted over the PUSCH, the BS may transmit, to the UE, a message B (Msg B) provided with information such as RAR, contention resolution, etc., as a response to the Msg A (S2303). Thereafter, depending on whether the UE receives the Msg B, the UE may complete access (or connection) to the BS in the same or similar way to the post procedure of the operation of receiving the Msg A in the legacy 4-step RACH procedure, and may transmit and receive data to and from the BS (S2305).

Various embodiments related to the UE operation for transmitting the message A (Msg A) and receiving the message B (Msg B) in the 2-step RACH procedure will hereinafter be described.

Embodiment 1: 2-Step RACH Procedure Selection Method of UE

In the 2-step RACH procedure, the Msg-A PUSCH is previously transmitted before the UE receives a response related to the Msg-A PRACH from the BS, so that the possibility of signal detection is not guaranteed in a different way from the Message 3 (Msg 3) in the 4-step RACH procedure. Generally, the cell coverage supporting the 2-step RACH procedure may be different from the cell coverage supporting the 4-step RACH procedure, or may be smaller in size than the cell coverage supporting the 4-step RACH procedure. If the UE capable of supporting both the 2-step RACH procedure and the 4-step RACH procedure transmits the Msg A to perform the 2-step RACH procedure without considering the low-quality channel state generated by a difference in configuration and scope of the above-mentioned cell coverage, a case where retransmission of the Msg A is required according to a channel condition may frequently occur.

In addition, unlike transmission of only the preamble to implement transmission of the Msg 1 in the 4-step RACH procedure, transmission of the Msg A in the 2-step RACH procedure is performed together with transmission of Msg A PRACH and Msg A PUSCH. As a result, since there occur resources to be allocated for the Msg A PUSCH in transmission or retransmission of the Msg A, the UE unavoidably consumes more resources during transmission or retransmission of the Msg A.

As described above, the Msg A is more likely to be retransmitted than the Msg 1 and the amount of resources consumed by the Msg A is greater than those of the Msg 1, so that the UE and the BS should prevent resources from being wasted and the procedure from being repeated without unnecessarily transmitting the Msg A. To this end, before the UE capable of supporting the 2-step RACH procedure and the 4-step RACH procedure decides to which one of RACH procedures will be performed, a reference for determining whether the UE can attempt to perform the 2-step RACH procedure may be established between the UE and the BS. That is, a threshold serving as a reference for performing the 2-step RACH procedure may be established between the UE and the BS. The UE may measure the quality of a channel to be used for transmission of the Msg A. When the measurement quality satisfies the condition of the threshold, the UE may attempt to perform the 2-step RACH procedure. When the measured quality does not satisfy the condition of the threshold, the UE may attempt to perform the 4-step RACH procedure. In this case, the threshold may refer to information included in the RACH configuration (system information or RRC signaling) for the 2-step RACH procedure, and may be transmitted from the BS to the UE.

For example, the UE may receive a threshold related to performance of the 2-step RACH procedure from the BS through higher layer signaling, and may measure a Reference Signal Received Power (RSRP) of a pathloss reference signal such as a Synchronization Signal Block (SSB) or a Channel State Information-Reference Signal (CSI-RS). When the RSRP value measured by the UE is equal to or greater than a previously received threshold, the UE can transmit the Msg A by selecting the 2-step RACH procedure. In contrast, when the RSRP value measured by the UE is less than the previously received threshold, the UE can transmit the Msg 1 by selecting the 4-step RACH procedure. If the RSRP value of the reference signal is equal to or greater than a predetermined threshold, the channel where the corresponding RSRP measurement was performed may have a channel quality equal to or greater than a predetermined quality level. If the UE transmits the Msg A only under the above-mentioned case, there is a higher possibility of a successful Msg-A reception procedure including the Msg A PUSCH decoding procedure of the BS, but there is a lower possibility of requesting retransmission of the Msg A so that unnecessary resource consumption can be prevented.

In this case, before the UE supporting the 2-step RACH procedure decides to perform the 2-step RACH procedure, the UE measures the RSRP value of the transfer (Tx) channel and performs the 2-step RACH procedure or the 4-step RACH procedure based on the measurement result of the RSRP value. In this case, the method for allowing the UE to perform the 2-step or 4-step RACH procedure based on the RSRP measurement result may be appreciated in a similar way to the method of using the RSRP measurement value of the CSI-RS related to SSB or QCL (Quasi Co-Location) when determining a candidate beam to be used for data transmission/reception of the UE. The UE supporting the 2-step RACH procedure may receive a threshold for the CSI-RS related to SSB or QCL for selection of a candidate beam from the BS through higher layer signaling. The UE may select an SSB where the RSRP measurement value is equal to or greater than the previously received threshold from among multiple available SSBs, and may use a candidate beam corresponding to the selected SSB. Alternatively, the UE may attempt to perform initial access using a candidate beam corresponding to the CSI-RS where the RSRP measurement value is equal to or greater than the previously received threshold.

In addition, before the UE supporting the 2-step RACH procedure determines to perform the 2-step RACH procedure, the UE may measure the RSRP value of the transfer channel, and may perform the 2-step RACH procedure or the 4-step RACH procedure based on the RSRP measurement result. In this case, the above-mentioned method for enabling the UE to perform the 2-step or 4-step RACH procedure based on the RSRP measurement result can also be applied to a frequency band such as a supplementary uplink (SUL) carrier. Similarly, applying the above method to the SUL carrier can be appreciated to be the same as using the RSRP measurement value for the SSB when determining a candidate beam to be used for data transmission and reception of the UE through the SUL carrier.

Embodiment 2: Sharing RACH Occasion (RO) Between 2-step RACH Procedure and 4-step RACH Procedure The configuration of the preamble transmitted through the Msg A PRACH in the 2-step RACH procedure and the configuration of the preamble transmitted through the Msg 1 in the 4-step RACH procedure should not be largely different from each other, but it is necessary for the BS configured to process multiple RACH procedures to distinguish the preamble being communicated for the 2-step RACH procedure from the other preamble being communicated for the 4-step RACH procedure. This is because the RACH procedures to be performed by the respective UEs may be different from each other, and any RACH procedure to be performed by one UE may also be changed according to situations.

For a specific distinction between the Msg 1 and the Msg A PRACH in a preamble transmission step, it is necessary to use a first method (1) in which different ROs are constructed between the 2-step RACH procedure and the 4-step RACH procedure so that preambles corresponding to the different ROs are distinguished from each other, or it is also necessary to use a second method (2) in which the same ROs are shared between the 2-step RACH procedure and the 4-step RACH procedure, but different preambles should be constructed in the 2-step RACH procedure and the 4-step RACH procedure and should be distinguished from each other.

In this case, assuming that the 2-step RACH procedure and the 4-step RACH procedure are configured to share the same ROs, the UE configured to perform the 2-step RACH procedure should satisfy the RACH configuration for the 4-step RACH procedure. This is because the RACH configuration, such as a transmission period configured in the UE, a preamble format, the number of PRACH slots within the subframe, etc. is based on the RO related to transmission of the preamble. In this case, whereas the UE configured to perform the 2-step RACH procedure is located near the BS so that a related configuration parameter such as a cyclic shift (CS) can be differently configured, the UE has disadvantages in that the UE is unavoidably affected by the same RACH configuration as in the legacy 4-step RACH procedure. In the 2-step RACH preamble that is attempted in a good channel state, there are a large number of preambles capable of being generated using the single preamble root index so that a separate cyclic shift should be configured for efficient use of resources. If the same RACH configuration as in the 4-step RACH procedure is applied to the 2-step RACH procedure, it may be difficult to configure the appropriate cyclic shift in the 2-step RACH procedure.

In addition, if each of the corresponding ROs is configured to have a short period in the case where the 2-step RACH procedure and the 4-step RACH procedure share the same ROs, resources for transmitting the Msg A PUSCH are not present in the corresponding period, so that it is impossible for the UE configured to perform the 2-step RACH procedure to transmit the Msg A.

Therefore, when allocating the RO between the 2-step RACH procedure and the 4-step RACH procedure, a method for allocating different ROs to the respective RACH procedures and distinguishing the different ROs from each other is considered appropriate. A method for allowing the 2-step RACH procedure and the 4-step RACH procedure to share the same ROs and to use different preambles to be distinguished from each other may be a secondary method of the above method for allocating and distinguishing different ROs, but additional discussion is required to solve the above-mentioned problems.

Embodiment 3: Necessity of RAR Detection Prior to Reception of Msg B

In the 2-step RACH procedure, a monitoring window or a contention resolution (CR) timer related to reception of the Msg B may be configured in a similar way to the length of the CR timer used in the legacy 4-step RACH procedure. Therefore, although the BS has failed to receive the preamble, the UE can retransmit the Msg A after expiration of the window or timer configured to have a long period.

However, in the 2-step RACH procedure, the UE can expect to receive the Msg 2 including the RAR on the basis of the RACH occasion (RO) corresponding to the preamble transmitted by the UE. In this case, the length of the monitoring window configured to receive the RAR in the 4-step RACH procedure may be shorter than the length of the monitoring window or timer configured to receive the Msg B in the 2-step RACH procedure. Therefore, based on the above-mentioned characteristics in the 2-step RACH procedure, assuming that the BS allows the RAR to further include information about whether the BS retransmits the Msg A and then transmits the resultant RAR to the UE, the UE can determine whether to retransmit the Msg A by receiving the RAR without awaiting expiration of the window or timer configured to have a relatively long period for the Msg B. A detailed method for utilizing the RAR will be described below.

Since a start point of the monitoring window for allowing the UE to receive the RAR in the 4-step RACH procedure is located after a transmission start point of the PRACH, a start point of the monitoring window or timer for allowing the UE to receive the Msg B in the 2-step RACH procedure is located after a transmission start point of the Msg A PUSCH.

In general, in the 4-step RACH procedure, the UE may retransmit the Msg 1 without receiving the RAR having a Random Access Preamble Index (RAPID) corresponding to the preamble transmitted by the UE. In this case, the length of the monitoring window configured to detect the RAR is up to 10 ms. Since the UE performs retransmission of the Msg 1 after lapse of the end point of the RAR monitoring window, the retransmission procedure of the Msg 1 is not problematic even if a maximum length of the time interval required for retransmission of the Msg 1 is set to 10 ms after initial transmission of the Msg 1, so that a maximum time required for such retransmission is considered not long enough.

On the other hand, unlike the RAR of the 4-step RACH procedure, the Msg B used in the 2-step RACH procedure may also be used as a message for transmitting not only the RAR but also contention-resolution information corresponding to the Msg 4. Therefore, the length of the monitoring window or timer for receiving the Msg B should consider not only the length of the RAR monitoring window but also the length of the CR timer, so that a maximum length of the monitoring window or timer for receiving the Msg B may be set to up to 64 ms in the same manner as in the maximum length of the CR timer. As described above, the length of the monitoring window or timer for the Msg B can be set to a very long length according to the respective cases, so that the time required for retransmission of the Msg A may also be very long.

Figure 24:
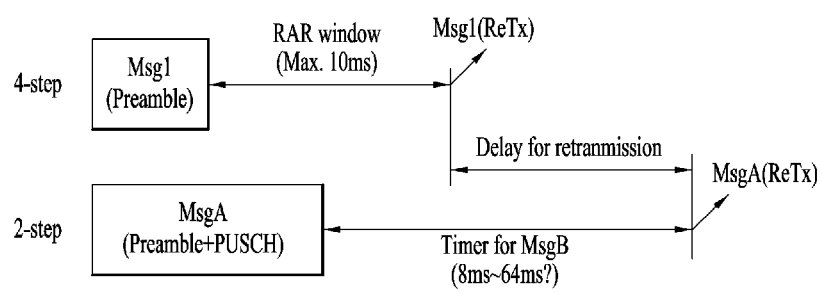
FIG. 24 is a diagram illustrating the result of comparison between a time period required for retransmission of Msg 1 in a 4-step RACH procedure and a time period required for retransmission of Msg A in a 2-step RACH procedure.
Figure 27:
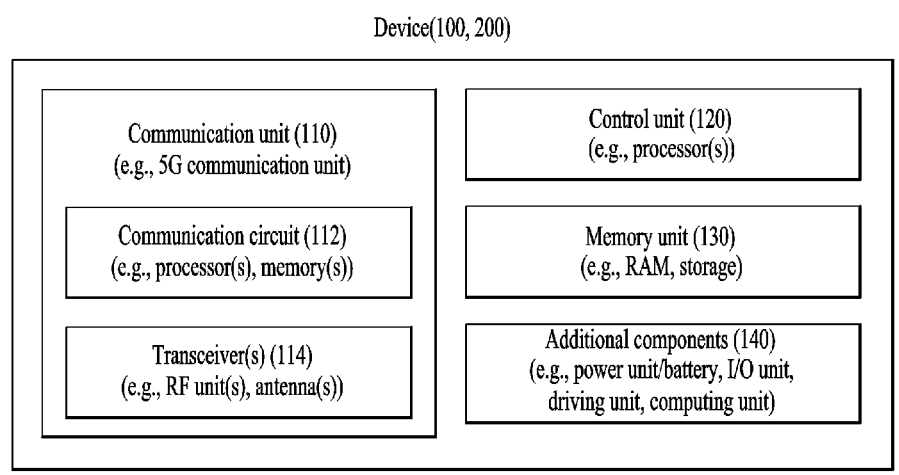

FIG. 24 is a diagram illustrating the result of comparison between a time period required for retransmission of the Msg 1 in the 4-step RACH procedure and a time period required for retransmission of the Msg A in the 2-step RACH procedure. In FIG. 27, whereas a maximum length of the RAR monitoring window in the 4-step RACH procedure is set to 10 ms corresponding to a relatively short period so that retransmission of the Msg 1 can be quickly performed, the timer of the Msg B in the 2-step RACH procedure may be set to have a relatively long period so that retransmission of the Msg A can be performed very late. As a result, time period consumed for a total random access channel (RACH) procedure in the case where a retransmission request for the Msg A occurs in the 2-step RACH procedure becomes longer than a time period consumed for a total random access channel (RACH) procedure in the other case where a retransmission request for the Msg 1 occurs in the 4-step RACH procedure.

In order to prevent much time from being consumed for retransmission of the Msg A, information about whether the Msg A PRACH of the BS was detected, information about whether both the Msg A PRACH and the Msg A PUSCH of the BS were detected, and information about whether both the Msg A PRACH and the Msg A PUSCH of the BS were decoded may be included in the RAR, and the resultant RAR is then transmitted to the UE. In other words, the BS may inform the UE of information about the detection result of the Msg A through the RAR, the UE may receive the RAR to recognize whether the Msg A transmitted by the UE itself was correctly received by the UE. However, the above-mentioned operation for allowing the RAR to further include information about whether both the Msg A PRACH and the Msg A PUSCH were detected and information about whether both the Msg A PRACH and the Msg A PUSCH were decoded, and then transmitting the resultant RAR to the UE can be made available only when the BS can physically transmit information about whether both the Msg A PRACH and the Msg A PUSCH can be detected and decoded prior to reception of the RAR.

In a situation where the UE can always expect to receive information about whether messages included in the Msg A were detected or decoded through the RAR, if the UE is scheduled to perform retransmission of the Msg A after lapse of the RAR monitoring window, a time required for retransmission of the Msg A becomes shorter than a time required for reception of the Msg B. That is, the UE can retransmit the Msg A at the end point of the RAR monitoring window shorter than the monitoring window or timer of the Msg B, so that the UE can reattempt to perform the access procedure at a time earlier than a retransmission time of the Msg A at the end point of the monitoring window or timer of the Msg B.

Here, the UE always performs blind decoding during a time period configured to detect a PDCCH required for reception of the Msg B. During the configured time period, the UE can also expect to receive the Msg 2 using the RA-RNTI that is calculated based on time/frequency resources used for preamble transmission. Therefore, assuming that the Msg 2 is configured to be transmitted to the UE at a time earlier than the Msg B, even when information about whether the Msg A was detected and/or decoded is included in the Msg 2, the UE can receive the corresponding information without any problems. In this case, the UE may attempt to retransmit the Msg A without waiting for reception of the Msg A.

Embodiment 4: Transform Precoder for Msg A PUSCH

In the 2-step RACH procedure of 5G NR, both a Discrete Fourier Transform-spread-Orthogonal Frequency Division Multiplexing (DFT-s-OFDM) scheme and a Cyclic Prefix-OFDM (CP-OFDM) scheme can be supported according to a transform precoding scheme for transmitting Msg-A payload. In association with the Msg A PUSCH, a method for indicating the transform precoding for Msg A PUSCH will hereinafter be described with reference to the method for indicating the transform precoding for Msg 3 PUSCH used in the legacy 4-step RACH procedure.

In order to indicate the transform precoder for PUSCH transmission in the 4-step RACH procedure, two types of parameters, for example, a UL common configuration such as 'msg3-transfromPrecoder' and a UE-specific PUSCH parameter such as 'transfromPrecoder', can be used. In order to indicate the transform precoder of the Msg A PUSCH of the 2-step RACH procedure by considering the Msg A PUSCH similar in structure to the Msg 3, it may be preferable to use the UL common configuration parameter from among the above two types of parameters.

In addition, the scheme for using the random access parameter of the legacy 4-step RACH procedure to indicate the transform precoder of the Msg A PUSCH may also be additionally considered to be used. Here, in a normal case, the UEs located adjacent to the BS are scheduled to perform the 2-step RACH procedure. As a result, even when use of the legacy random access parameter can be supported, a separate configuration parameter for the 2-step RACH procedure needs to be configured. That is, in order to indicate the transform precoder for transmission of the Msg A PUSCH, a separate configuration parameter for only the 2-step RACH procedure can be configured to indicate the transform precoder. Additionally, when a separate configuration parameter is not configured in a situation where the transform precoder is indicated, it may be preferable to indicate the transform precoder through the random access parameter of the legacy 4-step RACH procedure.

For example, the UE configured to perform the 2-step RACH procedure may still receive a parameter used to indicate a transform precoder of PUSCH transmission of the Msg 3, and may also receive a parameter used to indicate a transform precoder of Msg A PUSCH transmission. If the UE has correctly received the parameter used to indicate the transform precoder for Msg A PUSCH transmission, the UE may determine that the transform precoding scheme indicated by the corresponding parameter is applied to the Msg A. In contrast, when the UE does not receive the parameter used to indicate the transform precoder for Msg A PUSCH transmission, the UE may determine that the transform precoding scheme indicated by the parameter used to indicate transmission of Msg 3 PUSCH is applied to transmission of the Msg A.

Embodiment 5: Support Mechanism of Multiple PUSCH Configurations

A method for supporting (multiple) PUSCH configurations for flexible utilization of Msg A PUSCH transmission resources may be considered to be used. As a result, the Msg A PUSCH can be transmitted based on a relatively high MCS (Modulation and Coding Scheme) level, and much more information may be included in the Msg A PUSCH and the resultant Msg A PUSCH is then transmitted. When multiple PUSCH configurations are supported, the UE can directly determine related parameters to be used for the Msg A PUSCH from among the plurality of configurations. Accordingly, it is necessary for the BS to receive information about parameters determined through UCI (uplink control information) or RAPID, as well as to decode Msg A PUSCH based on the received information.

Whereas the method for transmitting information about parameters determined to transmit the Msg A PUSCH through the UCI is configured to be more effective as the MCS level supportable for the 2-step RACH procedure becomes higher or as the number of transport block sets (TBSs) increases, the above method has disadvantages in that the BS should decode UCI-related resources for reception of the Msg A PUSCH so that a time delay caused by such decoding procedure unavoidably occurs in the BS. Whereas the method for transmitting information about the parameters determined to transmit the Msg A PUSCH through the related RAPID has advantages in that the BS can immediately obtain information related to PRACH detection, the above method has disadvantages in that there is a smaller amount of transmittable information as compared to the method of utilizing UCI.

However, in the introduction stage of the current Rel.16 2-step RACH procedure, discussion on the number of supportable payload sizes, the MCS or TBS, etc. has not yet been concluded, so that the above-mentioned methods in which the UE transmits information about the parameters to be determined for Msg A PUSCH through UCI or RAPID should be used after determining how many types of PUSCH configurations can be supported.

Embodiment 6: Tx Beam Selection of Msg A

Since transmission of the Msg A in the 2-step RACH procedure includes all of transmission of the Msg A PRACH and transmission of the Msg A PUSCH, beam selection for all of Msg A PRACH transmission and Msg A PUSCH transmission or selection of a spatial filter should be considered to transmit the Msg A.

To this end, the following methods 1), 2), and 3) are under discussion. In more detail, 1) a first method in which Msg A PRACH and Msg A PUSCH use the same Tx beam or the same spatial filter, 2) a second method in which Msg A PRACH and Msg A PUSCH use the same or different Tx beams or spatial filters according to determination of the UE, and 3) a third method in which Msg A PRACH and Msg A PUSCH use the same or different Tx beams or spatial filters according to the instruction or assistance of the network are under discussion.

If a transmission (Tx) time interval between Msg A PRACH and Msg A PUSCH is short, there is a low possibility of deteriorating the beam or channel quality during the corresponding time interval, so that the UE need not change a current beam to another beam during a short time interval for transmission of the respective signals, and continuous maintenance of the selected Tx beam or the selected spatial filter may be considered appropriate. However, if the transmission (Tx) time interval between Msg A PRACH and Msg A PUSCH becomes longer, the quality of a beam or channel may be significantly changed. If the same Tx beam or the same spatial filter remains unchanged for transmission of the respective signals even when the beam or channel quality is expected to be deteriorated or dropped, an unexpected problem may occur in data communication between the UE and the BS.

Therefore, in order to guarantee the transmission/reception quality of Msg A between the UE and the BS, among the above-mentioned methods, the second method 2) in which the UE can flexibly determine the Tx beam or spatial filter for the Msg A PRACH and the Msg A PUSCH may be considered desirable. Although the second method 2) has not been discussed in the 2-step RACH procedure in the current Rel.16 standard, this means that, in the 4-step RACH procedure, the UE can decide whether the same or different Tx beams or spatial filters will be used to transmit the Msg 1 and the Msg 3.

Embodiment 7: Transmit (Tx) Power Control of Msg A (1) Initial Transmit (Tx) Power Control of Msg A PRACH For transmit (Tx) power control of Msg A PRACH of the 2-step RACH procedure, whether to use a power configuration parameter for Msg 1 of the legacy 4-step RACH procedure may be investigated. In association with utilization of power configuration parameters of the Msg 1, 1) a separate power configuration parameter distinguished from the Msg 1 is configured for Msg A PRACH and Tx power of the Msg A PRACH is controlled according to the corresponding parameter. If a separate power configuration parameter for Msg A PRACH is not configured in the above case 1), a method for controlling Tx power of the Msg A PRACH according to the power configuration parameter of the Msg 1 may be considered to be used. Alternatively, a second method 2) may also be considered to be used. In the second method 2), a separate power configuration parameter for Msg A PRACH is not configured and Tx power of Msg A PRACH is also controlled according to the power configuration parameter initially configured for Msg 1.

If the same target reception (Rx) power as in the legacy Msg 1 is applied to Msg A PRACH, much more time/frequency resources and much more power are consumed for reception of the Msg A as compared to the case of Msg 1 reception. However, nevertheless, the possibility of detecting the Msg A within the corresponding resources may not be significantly different from the possibility of detecting the legacy Msg 1. In this case, if the BS does not successfully detect the Msg A PRACH, a time consumed for the entire RACH procedure and UE power consumption may unavoidably increase, so that the UE and the BS cannot utilize the advantage of fast access of the 2-step RACH procedure, resulting in reduction in the necessity of performing the 2-step RACH procedure.

Therefore, in order to prevent the same power control configuration as the legacy Msg 1 from being applied to Msg A PRACH such that unnecessary power consumption and a procedure delay can be prevented from occurring in the Msg A PRACH, as well as to strengthen the advantages of the 2-step RACH procedure, a method for applying an independent power control configuration different from those of the Msg 1 to transmission of the Msg A PRACH may be considered appropriate. Specifically, considering that much more resources and much more power than Msg 1 transmission are consumed to transmit the Msg A PRACH, it may be preferable that initial transmission power to be allocated for Msg A PRACH be set to be higher than initial transmission power to be configured in Msg 1. That is, a method for separately setting the initial transmission power value for Msg A PRACH transmission to be higher than the initial transmission power value configured in Msg 1 and then applying the set initial transmission power value may be considered desirable for efficient power management in the 2-step RACH procedure. As a result, the UE and the BS can expect to detect the preamble at a higher possibility of preamble detection as compared to the possibility of preamble detection in the legacy Msg 1.

(2) Initial Transmit Power Control of Msg A PUSCH

In the 4-step RACH procedure according to 3GPP TS 38.213 standard, transmission (Tx) power of Msg 3 including a specific PO(PUSCH occasion)-based PUSCH may be determined based on the following PUSCH transmission (Tx) power equation.

$$P_{PUSCH,b,f,c}(i, j, q_d, l) = \min \begin{Bmatrix} P_{CMAX,f,c}(i), \\ P_{O\_PUSCH,b,f,c}(j) + 10\log_{10}(2'' \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, l) \end{Bmatrix}$$ [Equation]

When PUSCH transmission through Msg 3 is scheduled according to a UL grant included in the RAR, the value $P_{O\_PUSCH}$ corresponding to the sum of a cell-common factor and a UE-specific factor configured for each UE from among the parameters constructing the above equation may be determined by a target reception (Rx) power (preamblereceivedtargetpower, $P_{O\_Pre}$) and an offset value of the Msg3-delta preamble($\Delta_{PREAMBLE\_Msg3}$) and transmission power of the Msg 3 may be determined by application of the above equation according to the determined $P_{O\_PUSCH}$ value.

Power control configuration for Msg 3 in the legacy 4-step RACH procedure is basically applied based on BS feedback such as a random access response (RAR), so that the operation where the above Msg-3 power control configuration is equally applied to Msg A PUSCH transmitted prior to execution of the BS feedback may be considered improper. Hereinafter, various power control configuration factors capable of being established for proper transmission of the Msg A PUSCH, for example, a preamble offset, a Msg A PUSCH transmission format offset adjustment value ($\Delta_{TF}$) for satisfying a signal-to-interference-plus-noise ratio (SINR) of each bit transmitted to each resource element, a pathloss exponent factor ($\alpha$), a PUSCH power control adjustment state (f), etc. will be described below.

1) Preamble Offset

The preamble offset may be a value used to determine the $P_{O\_PUSCH}$ value from among factors constructing the PUSCH transmission power equation. As one example of the above-mentioned Msg 3 case, a preamble offset $\Delta_{PREAMBLE\_Msg3}$ configured for Msg 3 transmission is added to the $P_{O\_Pre}$ value used in general PUSCH transmission, so that the $P_{O\_PUSCH}$ value is constructed and transmission power is calculated based on the corresponding factor. The preamble offset value is added to the $P_{O\_Pre}$ value in a similar way to calculation of transmission power of the Msg A PUSCH, so that the $P_{O\_PUSCH}$ value can be determined. In this case, an available preamble offset value is as follows.

First of all, according to a first method (1), in the 2-step RACH procedure, a separate preamble offset is constructed for the Msg A PUSCH so that the corresponding preamble offset value can be used. According to a second method (2), the Msg3-delta preamble value ($\Delta_{PREAMBLE\_Msg3}$) of 3GPP TS standard Rel.15 may be equally applied to the Msg A PUSCH as a preamble offset. Alternatively, according to a third method (3), the sum of the $\Delta_{PREAMBLE\_Msg3}$ value and the additional correction (delta) value may be used as a preamble offset as necessary.

In order to discuss the above-described preamble offset, it is necessary to clearly configure a reference value to be compared. That is, in the case of Msg A PRACH, a separate power control configuration different from those of Msg 1 can be made available. The Msg A PUSCH is a message to be transmitted together with Msg A PRACH, so that the operation of establishing the transmission (Tx) power of the Msg A PUSCH without considering transmission (Tx) power of Msg A PRACH to be transmitted along with the Msg A PUSCH may be considered inefficient in terms of power management, and an unexpected load caused by a separate configuration of transmission (Tx) power may also occur.

Therefore, in order to define parameters used as offsets when viewed from the above standpoint, the above target reception (Rx) power parameter $P_{O\_Pre}$ may be a factor dedicated for the 2-step RACH procedure, and may be appreciated and applied in the same manner as in 2steppreamblereceivedtargetpower($P_{O\_Pre,2step}$).

In addition, considering that a target object to which the offset is applied is changed to the Msg A PUSCH corresponding to a message of the 2-step RACH procedure, instead of the Msg 3 corresponding to a message of the 4-step RACH procedure, the operation of utilizing the $\Delta_{PREAMBLE\_Msg3}$ factor used in the 4-step RACH procedure when determining the preamble offset may cause somewhat unnecessary calculations. As a result, it may be preferable that the preamble offset for the Msg A PUSCH be determined to be a factor related to the Msg A PRACH scheduled to be transmitted together, not the factor related to the Msg 3. That is, the equation indicating the Msg A PUSCH transmission power should correctly reflect transmission power of the Msg A PRACH. To this end, it may be preferable that the value of the parameter $P_{O\_PUSCH}$ shown in the above equation be determined to be the sum of target reception power ($P_{O\_Pre,MsgA}$)and the MsgA-delta preamble ($\Delta_{PREAMBLE\_MsgA}$)value, and the equation for the determined $P_{O\_PUSCH}$ value be used. The UE and the BS may determine the parameter $\Delta_{PREAMBLE\_MsgA}$ based on the relationship between Msg A PRACH and Msg A PUSCH to be a new offset for the 2-step RACH procedure, so that transmission power of the Msg A PUSCH can be calculated based on this offset.

2) Msg A PUSCH Transport Format Offset Adjustment Value ($\Delta_{TF}$)

In order to construct the value $\Delta_{TF}$ for Msg A PUSCH, there may be considered various methods in which the value deltaMCS for the 2-step RACH procedure configured separately from the 4-step RACH procedure is used or the other value deltaMCS configured for the 4-step RACH procedure is used.

As described in Embodiment 5, for flexible utilization of Msg A PUSCH transmission resources, multiple PUSCH configurations based on various time/frequency resources and MCS levels can be supported. Basically, considering that the parameter (deltaMCS) indicates whether to apply the deltaMCS value and is a cell-specific parameter given by RRC, in a situation where multiple PUSCH configurations are supported, it may be more preferable that the UE and the BS reuse the deltaMCS parameter configured for the 4-step RACH procedure. This is because, when using the delta-MCS parameter for use in the 2-step RACH procedure configures separately from the 4-step RACH procedure, overhead for signal processing may unavoidably increase regardless of few advantages of the separately-configured deltaMCS parameter.

3) Pathloss Index (a)

As an example of a method for compensating for the pathloss according to the value ($\alpha$) of the 2-step RACH procedure, the following methods 1), 2), and 3) may be used to compensate for partial pathloss. In the method 1), the value ($\alpha$) is set to 1 (i.e., $\alpha=1$) so that total pathloss can be compensated for. In the method 2, the value ($\alpha$) for the 2-step RACH procedure, which is configured separately from the 4-step RACH procedure, may be used to compensate for partial pathloss. In the method 3), the Msg3-alpha value may be used in the same manner as in the 4-step RACH procedure, so that partial pathloss can be compensated for.

In the 2-step RACH procedure, the BS cannot measure the locations of other UEs other than a connected UE or cannot transmit information about each UE. As a result, the pathloss index ($\alpha$) related to Msg A PUSCH transmission may be set to 1 (i.e., $\alpha=1$), so that it may be preferable to compensate for the total pathloss using the pathloss index ($\alpha$).

4) PUSCH Power Control Adjustment State (f)

The value (f) indicating a PUSCH power control adjustment state may consist of a Transmit Power Control (TPC) indication value and a total power ramp-up value requested by a higher layer. In the 2-step RACH procedure, open loop power control is supported for Msg A transmission, so that the TPC indication value need not be considered when determining the value (f).

However, when determining the value (d), the overall power ramp-up size should still be considered to be a ramping step size. The overall power ramp-up size may be determined according to a power difference between initial Msg A PUSCH transmission and the current Msg A PUSCH transmission, or may be determined by a power difference between initial Msg A PRACH transmission and the latest Msg A PRACH transmission. Here, the operation of determining the ramping step size of the Msg A PUSCH according to a power difference between the initial Msg A PUSCH transmission and the current Msg A PUSCH transmission may be understood as constructing an independent ramping step size for the Msg A PUSCH. On the other hand, the operation of determining the ramping step size of Msg A PUSCH according to a power difference between initial Msg A PRACH transmission and the latest Msg A PRACH transmission may be understood as constructing a ramping step size for the Msg A PUSCH in the same manner as the ramping step size configured in Msg A PRACH.

Although the Msg A PUSCH is a signal that is continuously transmitted using the same Msg A as in the Msg A PRACH after completion of Msg A PRACH transmission, the possibility of detection and collision of PRACH and PUSCH included in the corresponding Msg A may not always be the same. For example, although the plurality of UEs simultaneously transmits PRACH preambles through one RACH occasion (RO), PUSCH resources for the respective PRACH preambles may be allocated separately from each other, so that the possibility of detection and collision of the BS that can detect or collide with Msg A of each of the UEs may be determined differently according to messages (Msg A) of the respective UEs. As such, the possibility of detection and collision of Msg A may be changed differently according to the respective situations, so that the ramping step size of Msg A PUSCH may be set to an independent ramping step size regardless of the ramping step size of Msg A PRACH, instead of being set to the same value as that of the Msg A PRACH.

(3) Msg A PRACH/PUSCH Retransmission Power Control

When handling transmission (Tx) power of Msg A PRACH and transmission (Tx) power of Msg A PUSCH of the 2-step RACH procedure, power configuration for the above initial transmission and power configuration for retransmission should be discussed and concluded. At this time, for retransmission power configuration, various elements such as the ramping step size and the counter should also be discussed.

When using the ramping step size for power control, much more time/frequency resources and much more power are consumed to (re) transmit the Msg A as compared to the legacy Msg 1, so that the BS can efficiently utilize resources by flexibly utilizing the ramping step size according to the respective situations. For example, in order for the UE to access the BS at a higher speed, the ramping step size for Msg A PRACH may be separately configured to be larger than the ramping step size of the legacy Msg 1. To this end, the methods mentioned in the above-described embodiments may be required to establish an independent power control configuration for Msg A PRACH.

On the other hand, with respect to the ramping counter for power control, basically, retransmission of Msg A may cause the UE an unnecessary burden in terms of resources and power and may also cause inefficient resource utilization. As a result, the ramping counter for retransmitting the Msg A in the 2-step RACH procedure needs to be established separately from the Msg 1 of the 4-step RACH procedure.

The ramping counter for Msg-A retransmission power control in the 2-step RACH procedure may increase a count value in response to repetition of such Msg-A retransmission. If the counter configured to indicate a maximum number of times of Msg-A retransmission has expired, the UE that has attempted to perform the 2-step RACH procedure can attempt to perform Msg 1 transmission by falling back to the 4-step RACH procedure. In other words, when the count value reaches a maximum number of retransmission times for the 2-step RACH procedure, the UE may switch to the 4-step RACH procedure. At this time, the ramping counter used in power control for Msg 1 (re) transmission may be kept at the same value as in the other ramping counter used in MsgA retransmission, or may also be set to have a more increased value. Here, the counter indicating the maximum number of times may be a counter related to the number of times of Msg A transmission, and the ramping counter may be distinguished to be a counter related to power control for Msg A.

When the UE has continuously failed to transmit the Msg A, as retransmission of the Msg A is repeated, the value of the ramping counter configured to transmit the preamble through the Msg A also increases. In this case, the number of Msg-A retransmissions may be determined based on the counter designed to indicate the maximum number of Msg-A retransmissions, so that a maximum value of the ramping counter may also increase by the maximum number of retransmissions. Alternatively, even when Msg A transmission may fall back to Msg 1 transmission due to other circumstances of the UE or the BS, without reaching the maximum number of Msg A retransmissions, the count value of the ramping counter may increase by the number of performed Msg A retransmissions. At this time, after the Msg A has been retransmitted a predetermined number of times, if the UE falls back to Msg 1 transmission, this means that Msg A retransmission is completed and Msg 1 transmission is started, so that the count value of the ramping counter may not be initialized and newly start from zero '0'. That is, the ramping counter, a counter value of which has already been increased by the number of Msg A retransmissions, may be kept at the ramping counter value of the Msg 1. Alternatively, the previously-increased ramping counter value may further increase so that the resultant value may be used as a ramping counter value of the Msg 1. Through the above-mentioned ramping counter configuration, the UE and the BS may allow power required for Msg 1 transmission to be maintained at at least a predetermined power level for legacy Msg A transmission, so that the possibility of Msg 1 detection may further increase.

Embodiment 8: Search Space for Msg B

In the 4-step RACH procedure, Msg 2 and Msg 4 may be communicated between the UE and the BS using Type-1 PDCCH, and the search space may be explicitly indicated through the parameter RA-SearchSpace of PDCCH-Config-Common.

(1) In order to transmit and receive the Msg B related to the newly introduced 2-step RACH procedure, it is necessary to examine whether or not the same search space as in Msg 2 and Msg 4 can be basically applied. To this end, it should be recognized that a Radio Network Temporary Identifier (RNTI) different from a Radio Concept Network Temporary Identifier (RNTI) scrambling the Type-1 PDCCH for Msg 2 or Msg 4 can be used to scramble a Type-1 PDCCH for Msg B.

If the RNTI used to scramble the Type-1 PDCCH of Msg B is different from the RNTI used to scramble the Type-1 PDCCH of Msg 2 or Msg 4, the operation of constructing another search space different from those of Msg 2 or Msg 4 for Msg B reception may result in waste of resources. Thus, under the premise that RNTIs used are different from each other, it may be preferable to basically construct the same search space as Msg 2 or Msg 4 for reception of Msg B. For example, assuming that Msg B-RNTI is used for Msg B reception, this Msg B-RNTI is different in offset from RA(Random Access)-RNTI used for reception of Msg 2 or Msg 4, so that it may be preferable to construct the same search space as in Msg 2 or Msg 4 for reception of Msg B.

Figure 25:
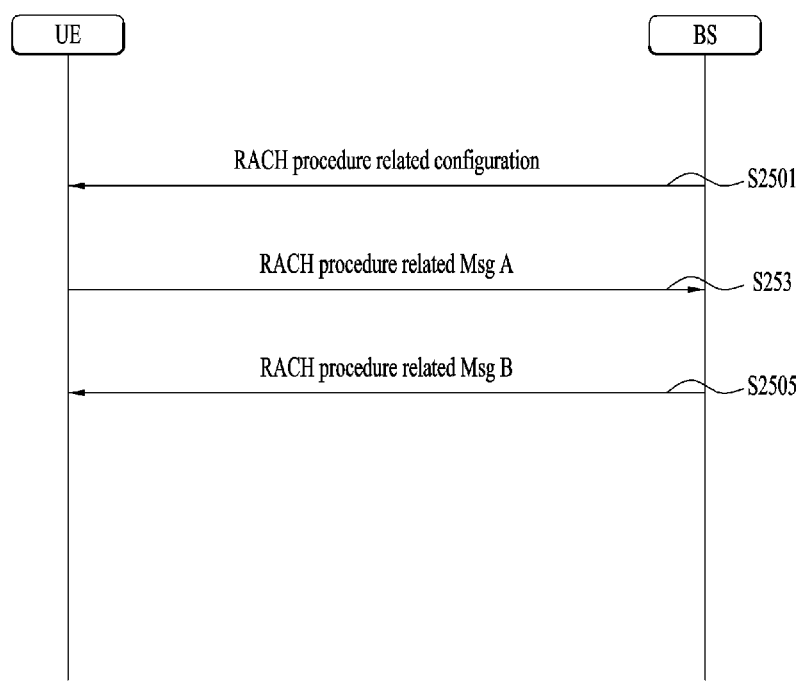
FIG. 25 is a flowchart illustrating the operations of the UE and the BS that are configured to perform the 2-step RACH procedure according to various embodiments of the present disclosure.
Figure 28:
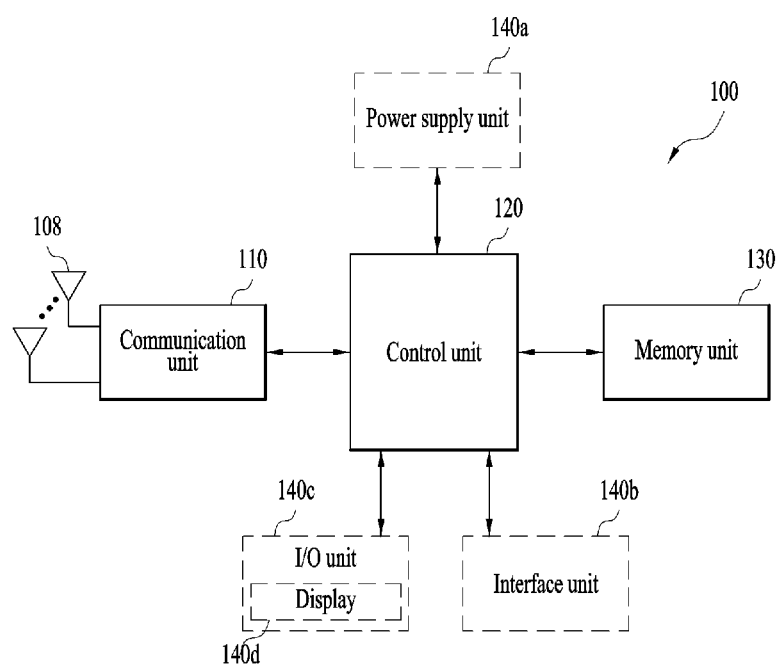

FIG. 25 is a flowchart illustrating the operations of the UE and the BS that are configured to perform the 2-step RACH procedure according to various embodiments of the present disclosure. Referring to FIG. 28, the UE and the BS may transmit and receive RACH configuration information to perform the 2-step RACH procedure, and the corresponding information may also include information related to the above-described embodiments (S2501).

Thereafter, the UE may transmit the Msg A for performing the 2-step RACH procedure to the BS upon receiving the RACH configuration from the BS. In this case, the UE may transmit the Msg A based on the embodiments of the present disclosure in relation to either a power control method for Msg A initial transmission or for Msg A retransmission. On the other hand, upon receiving the Msg A from the UE, the BS may detect the PRACH preamble and may decode the PUSCH. Similarly, the BS operation for receiving the Msg A may be performed based on the embodiments of the present disclosure in relation to a power control method for Msg A initial transmission or for Msg A retransmission (S2503).

The UE having transmitted the Msg A may perform blind decoding using the RNTI, and may receive the Msg B. In this case, information included in Msg B received by the UE or the search space that performs blind decoding of Msg B may be configured to satisfy the embodiments of the present disclosure. As a response to the Msg A, the BS may construct information of Msg B according to whether Msg A was successfully received and may transmit the Msg B information. Similarly, information included in Msg B transmitted from the BS or the search space where the Msg B is transmitted may be configured to satisfy the embodiments of the present disclosure (S2505).

When the BS does not detect the PRACH preamble included in Msg A received from the UE (S2503) or does not decode the PUSCH after detecting the PRACH preamble (S2503), the UE and the BS may fall back to the 4-step RACH procedure according to the embodiments of the present disclosure.

The various descriptions, functions, procedures, proposals, methods, and/or operational flowcharts of the various embodiments of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 26:
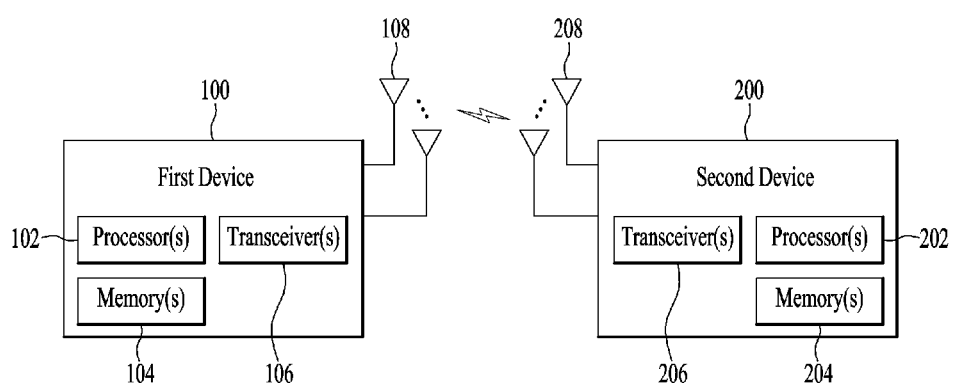
FIGS. 26 to 29 are diagrams illustrating various exemplary wireless devices to which embodiments of the present disclosure are applied.

FIG. 26 illustrates wireless devices applicable to the present disclosure.

Referring to FIG. 26, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 2.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including commands for performing all or a part of processes controlled by the processor(s) 102 or for performing the descriptions, functions, procedures, proposals, methods, and/or operational flowcharts disclosed in this document. Herein, the processor(s) 102 and the memory(s) 104 may be part of a communication modem/circuit/chip designed to implement RAT (e.g., LTE or NR). The transceiver(s) 106 may be connected to the processor(s) 102 and transmit and/or receive radio signals through the one or more antennas 108. Each of the transceiver(s) 106 may include a transmitter and/or a receiver. The transceiver(s) 106 may be interchangeably used with RF unit(s). In the present disclosure, a wireless device may refer to a communication modem/circuit/chip.

Hereinafter, a description will be given of instructions and/or operations controlled by the processor(s) 102 and stored in the memory(s) 104 of the first wireless device 100 according to an embodiment of the present disclosure.

While the following operations are described in the context of control operations of the processor(s) 102 from the perspective of the processor(s) 102, software code for performing the operations may be stored in the memory(s) 104.

The processor 102 may control the transceiver 106 to receive first information for a transform precoder related to the message A including a Physical Random Access Channel (PRACH) and a Physical Uplink Shared Channel (PUSCH). In addition, the processor 102 may control the transceiver 106 to transmit the message A (Msg A) to the BS based on the first information. The processor 102 may control the transceiver 106 to receive the message B (Msg B) including contention resolution information. In this case, a detailed method in which the processor 102 controls the transceiver 106 to transmit the message A (Msg A) and controls the transceiver 106 to receive the first information and the message B (Msg B) may be based on the above-mentioned embodiments of the present disclosure.

Specifically, commands stored in a memory 204 and/or operations, which are controlled by a processor 202 of the second wireless device 200 according to an embodiment of the present disclosure will be described below.

While the following operations are described in the context of control operations of the processor 202 from the perspective of the processor 202, software code for performing these operations may be stored in the memory 204.

The processor 202 may control the transceiver 206 to transmit first information for a transform precoder related to the message A including a Physical Random Access Channel (PRACH) and a Physical Uplink Shared Channel (PUSCH). In addition, the processor 202 may control the transceiver 206 to receive the message A (Msg A) based on the first information. The processor 202 may control the transceiver 206 to receive the message B (Msg B) including contention resolution information. In this case, a detailed method in which the processor 202 controls the transceiver 206 to receive the message A (Msg A) and controls the transceiver 206 to transmit the first information and the message B (Msg B) may be based on the above-mentioned embodiments of the present disclosure.

Hardware elements of the wireless devices 100 and 200 will be described in more detail. One or more protocol layers may be implemented by, but not limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more protocol data units (PDUs) and/or one or more service data unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive signals (e.g., baseband signals) from the one or more transceivers 106 and 206 and acquire PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, instructions, and/or a set of instructions.

The one or more memories 104 and 204 may be connected to the one or more processors 102 and 202 and store various types of data, signals, messages, information, programs, code, instructions, and/or commands The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit, to one or more other devices, user data, control information, and/or radio signals/channels mentioned in the methods and/or operational flowcharts of this document. The one or more transceivers 106 and 206 may receive, from one or more other devices, user data, control information, and/or radio signals/channels mentioned in the descriptions, functions, procedures, proposals, methods, and/or operational flowcharts disclosed in this document. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may control the one or more transceivers 106 and 206 to receive user data, control information, or radio signals from one or more other devices. The one or more transceivers 106 and 206 may be connected to the one or more antennas 108 and 208 and configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels from RF band signals into baseband signals in order to process received user data, control information, and radio signals/channels using the one or more processors 102 and 202. The one or more transceivers 106 and 206 may convert the user data, control information, and radio signals/channels processed using the one or more processors 102 and 202 from the base band signals into the RF band signals. To this end, the one or more transceivers 106 and 206 may include (analog) oscillators and/or filters.

FIG. 27 illustrates another exemplary a wireless device applied to the present disclosure. The wireless device may be implemented in various forms according to a use case/service (refer to FIG. 26).

Referring to FIG. 27, wireless devices 100 and 200 may correspond to the wireless devices 100 and 200 of FIG. 26 and may be configured with various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 1. For example, the transceiver(s) 114 may include the one or more transceivers 106 and 206 and/or the one or more antennas 108 and 208 of FIG. 1. The control unit 120 is electrically connected to the communication unit 110, the memory 130, and the additional components 140 and controls overall operations of the wireless devices. For example, the control unit 120 may control an electric/mechanical operation of the wireless device based on programs/code/commands/information stored in the memory unit 130. The control unit 120 may transmit the information stored in the memory unit 130 to the outside (e.g., other communication devices) through the communication unit 110 via a wireless/wired interface or store, in the memory unit 130, information received from the outside (e.g., other communication devices) through the communication unit 110 via the wireless/wired interface. Therefore, a specific operation of the control unit 120 and programs/code/commands/information stored in the memory unit 130 according to the present disclosure may corresponding to at least one operation of the processors 102 and 202 and at least one operation of the memories 104 and 204 illustrated in FIG. 26.

The additional components 140 may be configured in various ways according to the type of wireless device. For example, the additional components 140 may include at least one of a power unit/battery, input/output (I/O) unit, a driving unit, or a computing unit. The wireless device may be implemented in the form of, but not limited to, the robot (100a of FIG. 2), the vehicles (100b-1 and 100b-2 of FIG. 2), the XR device (100c of FIG. 2), the hand-held device (100d of FIG. 2), the home appliance (100e of FIG. 2), the IoT device (100f of FIG. 2), a digital broadcasting terminal, a hologram device, a public safety device, an MTC device, a medical device, a FinTech device (or a financial machine), a security device, a climate/environment device, the AI server/device (400 of FIG. 2), a BS (200 of FIG. 2), a network node, or the like. The wireless device may be used in a mobile or fixed place according to a use case/service.

In FIG. 27, all of the various elements, components, units/portions, and/or modules in the wireless devices 100 and 200 may be inter-connected through a wired interface or at least a part thereof may be wirelessly inter-connected through the communication unit 110. For example, in each of the wireless devices 100 and 200, the control unit 120 and the communication unit 110 may be connected wiredly, and the control unit 120 and first units (e.g., 130 and 140 ) may be connected wirelessly through the communication unit 110. Each element, component, unit/portion, and/or module in the wireless devices 100 and 200 may further include one or more elements. For example, the control unit 120 may be configured as a set of one or more processors. For example, the control unit 120 may be configured as a set of a communication control processor, an application processor, an electronic control unit (ECU), a graphical processing unit, and a memory control processor. In another example, the memory unit 130 may be configured as a RAM, a DRAM, a ROM, a flash memory, a volatile memory, a non-volatile memory, and/or a combination thereof.

Now, a detailed description will be given of an implementation example of the devices illustrated in FIG. 27 with reference to the drawings.

FIG. 28 illustrates a hand-held device applied to the present disclosure. The hand-held device may include a smartphone, a smart pad, a wearable device (e.g., a smart watch or smart glasses), or a portable computer (e.g., a laptop). The hand-held device may be referred to as a mobile station (MS), a user terminal (UT), a mobile subscriber station (MSS), a subscriber station (SS), an advanced mobile station (AMS), or a wireless terminal (WT).

Referring to FIG. 28, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 27, respectively.

The communication unit 110 may transmit and receive signals (e.g., data and control signals) to and from other wireless devices or BSs. The control unit 120 may perform various operations by controlling components of the hand-held device 100. The control unit 120 may include an application processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, and so on. The interface unit 140b may support connection between the hand-held device 100 and other external devices. The interface unit 140b may include various ports (e.g., an audio I/O port and a video I/O port) for connection to external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

For example, in the case of data communication, the I/O unit 140c may acquire information/signals (e.g., touch, text, voice, images, or video) input by the user and the acquired information/signals may be stored in the memory unit 130. The communication unit 110 may convert the information/signals stored in the memory into radio signals and transmit the radio signals to other wireless devices directly or to a BS. The communication unit 110 may receive radio signals from other wireless devices or the BS and then restore the received radio signals to original information/signals. The restored information/signals may be stored in the memory unit 130 and output as various types (e.g., text, voice, images, video, or haptic) through the I/O unit 140c.

Figure 29:
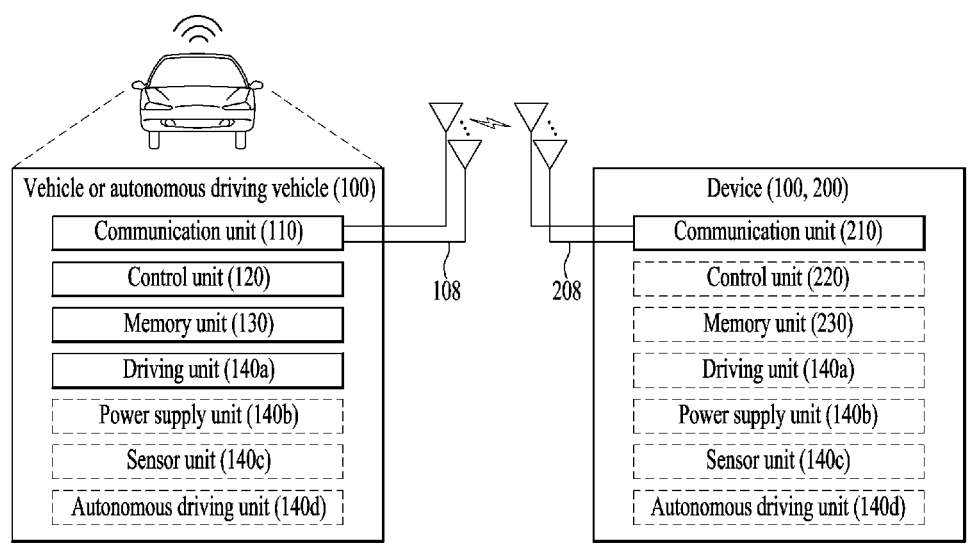

FIG. 29 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 29, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 27, respectively.

The communication unit 110 may transmit and receive signals (e.g., data and control signals) to and from external devices such as other vehicles, BSs (e.g., gNBs and road side units), and servers. The control unit 120 may perform various operations by controlling components of the vehicle or the autonomous driving vehicle 100. The control unit 120 may include an ECU. The driving unit 140 a may cause the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information a vehicle state, ambient environment information, user information, and so on. The sensor unit 140c may include an inertial measurement unit (IMU) sensor, a collision sensor, a wheel sensor, a speed sensor, an inclination sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, and so on from an external server. The autonomous driving unit 140d may generate an autonomous driving path and a driving plan based on the obtained data. The control unit 120 may control the driving unit 140a to drive the vehicle or the autonomous driving vehicle 100 along the autonomous driving path according to the driving plan (e.g., speed/direction control). In the middle of autonomous driving, the communication unit 110 may aperiodically or periodically acquire the latest traffic information data from the external server and acquire surrounding traffic information data from neighboring vehicles. In the middle of autonomous driving, the sensor unit 140c may obtain information about a vehicle state and/or surrounding environment information. The autonomous driving unit 140d may update the autonomous driving path and the driving plan based on the newly obtained data/information. The communication unit 110 may transfer information about a vehicle position, the autonomous driving path, and the driving plan to the external server. The external server may predict traffic information data using AI technology based on the information collected from vehicles or autonomous driving vehicles, and provide the predicted traffic information data to the vehicles or the autonomous driving vehicles.

Figure 30:
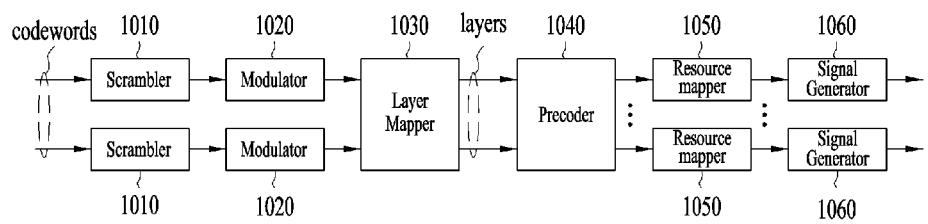
FIG. 30 is a diagram illustrating an exemplary signal processing circuit to which embodiments of the present disclosure are applied.

FIG. 30 illustrates a signal processing circuit for a transmission signal.

Referring to FIG. 30, a signal processing circuit 1000 may include scramblers 1010, modulators 1020, a layer mapper 1030, a precoder 1040, resource mappers 1050, and signal generators 1060. An operation/function of FIG. 30 may be performed by, but not limited to, the processors 102 and 202 and/or the transceivers 106 and 206 of FIG. 26. Hardware elements of FIG. 30 may be implemented by the processors 102 and 202 and/or the transceivers 106 and 206 of FIG. 26. For example, the blocks 1010 to 1060 may be implemented by the processors 102 and 202 of FIG. 26. Alternatively, the blocks 1010 to 1050 may be implemented by the processors 102 and 202 of FIG. 26 and the block 1060 may be implemented by the transceivers 106 and 206 of FIG. 26.

Codewords may be converted into radio signals through the signal processing circuit 1000 of FIG. 30. The codewords are coded bit sequences of information blocks. The information blocks may include TBs (e.g., UL-SCH TBs or DL-SCH TBs). The radio signals may be transmitted on various physical channels (e.g., a PUSCH or a PDSCH).

Specifically, the codewords may be converted into scrambled bit sequences by the scramblers 1010. Scramble sequences used for scrambling may be generated based on an initialization value, and the initialization value may include ID information about a wireless device. The scrambled bit sequences may be modulated to modulation symbol sequences by the modulators 1020. A modulation scheme may include pi/2-binary phase shift keying (pi/2-BPSK), m-phase shift keying (m-PSK), and m-quadrature amplitude modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. N is the number of antenna ports, and M is the number of transport layers. The precoder 1040 may perform precoding after transform precoding (e.g., DFT) for complex modulation symbols. Alternatively, the precoder 1040 may perform precoding without transform precoding.

The resource mappers 1050 may map modulation symbols of each antenna port to time-frequency resources. The time-frequency resources may include a plurality of symbols (e.g., CP-OFDMA symbols or DFT-s-OFDMA symbols) in the time domain and a plurality of subcarriers in the frequency domain. The signal generators 1060 may generate radio signals from the mapped modulation symbols, and the generated radio signals may be transmitted to other devices through each antenna. For this purpose, the signal generators 1060 may include inverse fast Fourier transform (IFFT) modules, CP inserters, digital-to-analog converters (DACs), and frequency upconverters.

Signal processing procedures for a signal received in the wireless device may be configured reversely to the signal processing procedures 1010 to 1060 of FIG. 5. For example, the wireless devices (e.g., 100 and 200 of FIG. 1) may receive radio signals from the outside through the antenna ports/transceivers. The received radio signals may be converted into baseband signals through signal restorers. To this end, the signal restorers may include frequency downconverters, analog-to-digital converters (ADCs), CP remover, and FFT modules. Subsequently, the baseband signals may be restored to codewords by resource demapping, postcoding, demodulation, and descrambling. The codewords may be decoded to original information blocks. Therefore, the signal processing circuit (not shown) for a received signal may include signal restorers, resource demappers, a postcoder, demodulators, descramblers, and decoders.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

A specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the term fixed station, gNode B (gNB), Node B, enhanced Node B (eNode B or eNB), access point, and so on.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

While the method and apparatus for transmitting and receiving a DL signal have been described above in the context of being applied to a 5G New RAT system, they are also applicable to various wireless communication system as well as the 5G New RAT system.

The invention claimed is:

1. A method for transmitting and receiving signals for performing a 2-step random access channel (RACH) procedure by a user equipment (UE) in a wireless communication system, the method comprising:
    setting a RACH procedure to the 2-step RACH procedure based on a reference signal received power, RSRP, of a pathloss reference signal being above a threshold, wherein the threshold is received via a radio resource control, RRC, signalling;
    receiving, from a base station, BS, both of a first parameter and a second parameter or receiving the second parameter without the first parameter,
    wherein the first parameter is a configuration parameter used to indicate a transform precoding for a transmission of a payload on a message A physical uplink shared channel, PUSCH, for 2-step RACH procedure, and
    wherein the second parameter is a configuration parameter used to indicate a transform precoding for a transmission of a payload on a message 3 PUSCH for 4-step RACH procedure;
    transmitting, to the base station (BS), a message A including a preamble on a physical random access channel (PRACH) and the payload on the message A PUSCH according to an indicated transform precoding; and
    receiving a message B including contention resolution information from the BS,
    wherein, based on the first parameter being received, the first parameter is used to indicate to the UE the transform precoding for the transmission of the payload on the message A PUSCH in the 2-step RACH procedure, and
    wherein, based on the first parameter not being received, the second parameter is used to indicate to the UE the transform precoding for the transmission of the payload on the message A PUSCH in the 2-step RACH procedure.

2. The method according to claim 1, wherein the first parameter and the second parameter are based on an uplink common configuration.

3. The method according to claim 1, wherein the first parameter and the second parameter are received by higher layer signaling.

4. The method according to claim 1, wherein the transform precoding is a Discrete Fourier Transform-spread-Orthogonal Frequency Division Multiplexing (DFT-s-OFDM) scheme or a Cyclic Prefix-OFDM (CP-OFDM).

5. A device configured to transmit and receive signals for performing a 2-step random access channel (RACH) procedure in a wireless communication system comprising:
    at least one processor; and
    at least one memory operatively connected to the at least one processor, and configured to store instructions such that the at least one processor performs specific operations by executing the instructions,
    wherein the specific operations include:
        setting a RACH procedure to the 2-step RACH procedure based on a reference signal received power, RSRP of a pathloss reference signal being above a threshold, wherein the threshold is received via a radio resource control, RRC, signalling;
        receiving, from a base station, BS, both of a first parameter and a second parameter or receiving the second parameter without the first parameter,
        wherein the first parameter is a configuration parameter used to indicate a transform precoding for a transmission of a payload on a message A physical uplink shared channel, PUSCH, for 2-step RACH procedure, and
        wherein the second parameter is a configuration parameter used to indicate a transform precoding for a transmission of a payload on a message 3 PUSCH for 4-step RACH procedure;
        transmitting a message A including a preamble on a physical random access channel (PRACH) and the payload on the message A PUSCH according to an indicated transform precoding; and
        receiving a message B including contention resolution information from the BS,
        wherein, based on the first parameter being received, the first parameter is used to indicate to the UE the transform precoding for the transmission of the payload on the message A PUSCH in the 2-step RACH procedure, and
        wherein, based on the first parameter not being received, a second parameter is used to indicate to the UE the transform precoding for the transmission of the payload on the message A PUSCH in the 2-step RACH procedure.

6. The device according to claim 5, wherein the first parameter and the second parameter are based on an uplink common configuration.

7. The device according to claim 5, wherein:
the first parameter and the second parameter are received by higher layer signaling.

8. The device according to claim 5, wherein the transform precoding is a Discrete Fourier Transform-spread-Orthogonal Frequency Division Multiplexing (DFT-s-OFDM) scheme or a Cyclic Prefix-OFDM (CP-OFDM).

9. A user equipment (UE) configured to transmit and receive signals for performing a 2-step random access channel (RACH) procedure in a wireless communication system comprising:
at least one transceiver;
at least one processor; and
at least one memory operatively connected to the at least one processor, and configured to store instructions such that the at least one processor performs specific operations by executing the instructions,
wherein the specific operations include:
setting a RACH procedure to the 2-step RACH procedure based on a reference signal received power, RSRP of a pathloss reference signal being above a threshold, wherein the threshold is received via a radio resource control, RRC, signalling;
receiving, from a base station, BS, both of a first parameter and a second parameter or receiving the second parameter without the first parameter,
wherein the first parameter is a configuration parameter used to indicate a transform precoding for a transmission of a payload on a message A physical uplink shared channel, PUSCH, for 2-step RACH procedure, and
wherein the second parameter is a configuration parameter used to indicate a transform precoding for a transmission of a payload on a message 3 PUSCH for 4-step RACH procedure;
transmitting, to the base station (BS), a message A including a preamble on a physical random access channel (PRACH) and the payload on the message A PUSCH according to an indicated transform precoding; and
receiving a message B including contention resolution information from the BS,
wherein, based on the first parameter being received, the first parameter a is used to indicate to the UE the transform precoding for the transmission of the payload on the message A PUSCH in the 2-step RACH procedure, and
wherein, based on the first parameter not being received, a second parameter is used to indicate to the UE the transform precoding for the transmission of the payload on the message A PUSCH in the 2-step RACH procedure.

* * * * *